United States Patent
Ukita

(10) Patent No.: US 7,206,255 B2
(45) Date of Patent: Apr. 17, 2007

(54) SIGNAL PROCESSING APPARATUS AND SIGNAL PROCESSING METHOD

(75) Inventor: Masakazu Ukita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/276,674

(22) Filed: Mar. 9, 2006

(65) Prior Publication Data

US 2006/0146648 A1  Jul. 6, 2006

Related U.S. Application Data

(62) Division of application No. 09/938,787, filed on Aug. 24, 2001, now Pat. No. 7,054,452.

(30) Foreign Application Priority Data

Aug. 24, 2000  (JP) .......................... P2000-253306

(51) Int. Cl.
*G01V 1/00* (2006.01)

(52) U.S. Cl. ........................................ 367/38; 702/17

(58) Field of Classification Search .................. 367/38, 367/40, 49; 702/14, 17, 191
See application file for complete search history.

(56) References Cited

U.S. PATENT DOCUMENTS 5,182,729 A * 1/1993 Duren et al. .................. 367/38
5,721,710 A * 2/1998 Sallas et al. .................. 367/41

* cited by examiner

*Primary Examiner*—Mark Hellner
(74) *Attorney, Agent, or Firm*—Sonnenschein Nath & Rosenthal LLP

(57) ABSTRACT

The invention provides a method and apparatus by which the direction in or the position at which a signal source such as a sound source is present is estimated. A signal or signals from a signal source or a plurality of signal sources are received by a plurality of reception apparatus, and the received signals are decomposed into signals of different frequency bands by a plurality of band-pass filters. Then, cross correlation functions between the different frequency band signals are calculated for individual combinations of the reception apparatus for the individual corresponding frequency bands. If the power of noise having no directivity is high in some of the frequency bands, then the cross correlation functions of the frequency band do not exhibit a maximum value. Therefore, an influence of the noise can be suppressed effectively when delay times of the individual reception apparatus which depend upon the direction or directions or the position or positions of the signal source or sources are estimated.

17 Claims, 16 Drawing Sheets

SIGNAL PROCESSING APPARATUS AND SIGNAL PROCESSING METHOD

CROSS-REFERENCE TO RELATED APPLICATIONS

The present application is a divisional of U.S. patent application Ser. No. 09/938,787, filed Aug. 24, 2001, now U.S. Pat. No. 7,054,452 and also claims priority to Japanese Patent Application No. JP2000-253306, filed Aug. 24, 2000. Both of these related applications are incorporated herein by reference to the extent permitted by law.

BACKGROUND OF THE INVENTION

This invention relates to a signal source direction or position estimation method and apparatus for estimating the direction or the position in or at which a signal source such as a sound source is present, and more particularly to a signal source direction or position estimation method and apparatus wherein the direction or the position of a signal source or each of a plurality of signal sources are estimated based on cross correlation functions between signals received by a plurality of reception apparatus.

The present invention further relates to a signal emphasis method and apparatus wherein a signal of a signal source or a plurality of signals of different signal sources are emphasized based on cross correlation functions between signals received by a plurality of reception apparatus.

A technique of estimating the direction or the position of a signal source in such environment that much noise is present or a plurality of signal sources generate signals simultaneously is utilized for a system which adapts a reception apparatus so as to receive a signal from a signal source better, another system which automatically directs a video camera to the direction of a signal source to supervise the signal source, a television conference system which automatically directs a video camera toward the direction of a speaker to transmit a video of the speaker, and like systems.

In a technical field of signal processing of the type mentioned, it is a conventionally used technique to use a plurality of reception apparatus to receive an originated signal and estimate the direction or the position of the signal source based on cross correlation functions between the received signals of the reception apparatus.

For example, Japanese Patent Laid-Open No. Hei 11-83982 discloses a sound source direction detection apparatus wherein a delay time corresponding to an assumed sound source direction angle between outputs of two microphones selected from among a plurality of microphones is provided to determine cross correlation coefficients and a value obtained by adding the cross correlation coefficients is displayed with respect to the sound source direction angle. With the above-described sound source direction detection apparatus, the incoming direction of sound can be detected accurately irrespective of the type of sound wave even when the SN (signal to noise) ratio is low.

Japanese Patent Laid-Open No. Hei 11-304906 discloses a sound source position estimation method wherein cross correlation functions of signals received by a plurality of microphones are calculated for all pairs of the microphones and time differences which provide maximum values of the cross correlation functions are set as preliminary estimated time differences, and then time differences which provide a maximum power of a delayed sum regarding all of the microphones are searched for around the preliminary estimated time differences and set as estimated time differences and the position of the sound source is calculated based on the estimated time differences. A time difference corresponds to a directional angle of a sound source. By providing delays to the individual microphones and adding them, the reception sensitivity in a particular direction can be raised. The sound source position estimation method is superior in noise-resisting property and requires a comparatively small amount of arithmetic operation.

Japanese Patent No. 2982766 discloses a method and an apparatus wherein, from a plurality of audio signals obtained by a plurality of microphones, code time series of polarities extracted from the signals themselves or the signals after whitened by reverse filtering using autoregression coefficients calculated from the signals are produced, and cross correlation functions of the code time series are calculated. Then, normalized powers are calculated from the cross correlation functions and a time average of the normalized powers is calculated, and then the sound source direction is estimated based on the time average.

The prior art apparatus and methods described above, however, cannot estimate the direction or directions or the position or positions of a signal source or sources sufficiently where significant noise is present or where a comparatively great number of signal sources generate signals at a time.

In the apparatus of Japanese Patent Laid-Open No. Hei 11-304906, time differences which provide maximum values of cross correlation functions are set as preliminary estimated time differences, and then time differences which provide a maximum power of a delayed sum regarding all of the microphones are searched for around the preliminary estimated time differences and the position of the sound source is calculated based on the estimated time differences (described above). If it is tried to apply, in a situation wherein a plurality of signal sources are present, the method to estimation of the directions or the positions of the signal sources, it is necessary to determine preliminary estimated times corresponding to the individual signal sources from cross correlation functions and then determine time differences which provide a maximum power of the delay sum in the proximity of the individual preliminary estimated times. Therefore, the amount of calculation required for the search increases in proportion to the number of the signal sources.

Meanwhile, in the method disclosed in Japanese Patent No. 2982766, in order to reduce the hardware scale of the apparatus, cross correlation functions of signals are not calculated, but the direction of a signal source is estimated based on cross correlation functions of a code time series only of polarities extracted from the signals themselves or on the signals after whitened.

In the method which involves the extraction only of polarities of the signals themselves, where noise of a low frequency having a comparatively high level is included in the received signals, the extracted code time series exhibits successive appearances of −1 or +1 over a period of approximately one half the period of the noise. Accordingly, the code time series corresponds not to the signal of a sound source but to the low frequency noise, and therefore, the direction of the sound source cannot be determined from the cross correlation functions of the code time series.

Meanwhile, where the method wherein the polarities of the signals after whitened are extracted is utilized, a unique characteristic to codes from the sound source included in the received signals is lost through the process of the whitening process. Therefore, the cross correlation functions are influenced significantly by noise, and consequently, the estimation function of the sound source direction is deteriorated. It is to be noted that a whitening method is disclosed, for example, in "Improvement of the performance of cross correlation method for identifying aircraft noise with pre-whitening of signals", The Journal of the Acoustical Society of Japan, vol. 13, No. 4, pp. 241–252, July 1992. This method, however, is directed to noise of an aircraft measured in the proximity of an airfield.

Japanese Patent No. 2985982 discloses a sound source direction estimation method wherein outputs of two microphones are band-divided first and then powers of the signals are determined for the individual frequency bands, and peak values of the powers are held and logarithms of the peak values are calculated. Then, cross correlation functions of the time differentiation processed signals for the individual frequency bands are determined and then weighted averaged, and then the sound source direction is calculated from the time differences with which the weighted averages take maximum values.

With the method just described, even where many reflected sounds are present, the direction of a sound source can be estimated directly based on sound. According to the method, however, a great amount of calculation is required for logarithmic calculation for the frequency bands of the input signals from the microphones, and hardware of a large scale is required to perform such calculation. Further, where the power of a signal is comparatively low or where the power of noise is comparatively high, it is sometimes impossible to reduce the influence of reflected sound through the logarithmic processing. For example, if it is assumed that the power of dark noise is 1 and direct sound with the power of 2 arrives and then reflected sound whose power is 3 arrives, then the value after the logarithmic processing is 3.0 dB for the dark noise and 4.7 dB for the reflected sound. Accordingly, although the magnitude of the reflected sound before the logarithmic processing is 1.5 times that of the direct sound, the magnitude of the reflected sound after the logarithmic processing is 1.57 times, and the influence of the reflected sound is not reduced numerically.

It is to be noted here that the "reflected sound" includes both of the continuing direct sound and reflected sound coming thereto additionally. Usually, the power of the reflected sound itself does not become higher than the power of the direct sound. In a special situation where a directive microphone is used, if it is assumed that the direction in which the microphone exhibits a higher directivity coincides with or is similar to the incoming direction of the reflected sound while the direction in which the microphone exhibits a lower directivity coincides with or is similar to the incoming direction of the direct sound, then the power of the reflected sound itself may possibly be higher than the power of the direct sound.

A technique of suppressing, in such a situation that much noise is present or a plurality of signal sources generate signals at a time, the influence of a signal from another signal source and emphasizing or separating a signal from a certain signal source is utilized in order to raise the recognition performance of a speech recognition apparatus in case where the signal is an audio signal, or to raise the identification performance of a signal source identification apparatus which compares a received signal with signals measured in advance for possible kinds of signal sources to specify the signal source.

In the field of such signal emphasis and separation techniques as described above, it is a common technique to receive a signal by means of a plurality of reception apparatus, estimate delay times of the individual reception apparatus which depend upon the direction or the position of a signal source and the positions of the reception apparatus based on cross correlation functions between the received signals and so forth, use the estimated delayed times to delay the received signals, and add the delayed received signals to emphasize or separate the signal of the signal source.

For example, Japanese Patent Laid-Open No. Hei 5-95596 discloses a noise reduction apparatus wherein audio signals received by a plurality of microphones are decomposed into signals of different frequency bands by respective band-pass filters and cross correlation functions between the different frequency band signals are determined, and time differences of the audio signals are detected from the cross correlation functions and then the audio signals are delayed based on the detection time differences and then added. With the noise reduction apparatus, by combining input audio signals, an audio signal can be emphasized and extracted while suppressing noise thereby to improve the SN ratio.

Japanese Patent Laid-Open No. Hei 9-251299 discloses a microphone array inputting type speech recognition apparatus and method wherein an input signal from a microphone array including a plurality of microphones is frequency-divided by a band-pass filter bank to obtain band-pass waveforms of the individual frequency bands for the different microphone channels, and band-pass power distributions are determined individually for assumed sound source positions or directions by a minimum variance method or the like. The band-pass power distributions of the different frequency bands are unified with regard to all of the frequency bands to estimate the sound source position or direction, and pertaining band-pass powers are extracted as audio parameters from the band-pass power distributions of the individual frequency bands based on the estimated sound source position or direction to perform speech recognition.

Japanese Patent No. 2928873 discloses a signal processing apparatus wherein signals of different frequency bands of wave motions detected by a plurality of wave motion collection circuits or time level variations of the signals are determined as signal components, and cross correlation functions of the signal components of the individual frequency bands are calculated and time differences between the signal components whose correlation value exceeds a preset threshold value are determined. Then, the signal components of the frequency bands whose time difference is included within a predetermined delay time are extracted, and the wave motion components arriving from a particular position corresponding to the predetermined delay time are outputted for the individual frequency bands, or such signal components are added to output a wave motion component arriving from the particular position.

However, the noise reduction apparatus disclosed in Japanese Patent Laid-Open No. Hei 5-95596 is designed so as to be utilized principally for a car telephone, and the sound source whose signal is to be emphasized is the voice of the driver of the automobile and it is assumed that a single signal source is involved. In other words, the noise reduction apparatus is not directed to emphasis of signals from a plurality of sound sources. Further, since the noise reduction apparatus presumes a rough position of the single sound source in advance, it is not directed to a process regarding a sound source positioned at an arbitrary position. Further, since the emphasis signal is obtained by delaying a signal prior to decomposition into signals of different frequency bands as it is, if comparatively high noise is included in a certain frequency band, then the noise cannot be suppressed sufficiently.

Meanwhile, in the microphone array inputting type speech recognition apparatus and method disclosed in Japanese Patent Laid-Open No. Hei 9-251299, the band-pass power distributions of the individual assumed sound source positions or directions are determined by a minimum variance method or the like. However, the minimum variance method is one of methods which can be applied where the number of sound sources is smaller than the total number of microphones included in the microphone array, and involves a great amount of calculation. If a delay sum method is used in place of the minimum variance method, then the amount of calculation can be reduced by a certain amount, but this deteriorates the estimation accuracy of the sound source position or direction. Accordingly, where the number of signal sources and the positions or the directions of the signal sources are unknown, it is necessary to prepare a number of microphones which can be considered sufficient and apply the minimum variance method or the like while the assumed signal source position or direction is changed or set a plurality of presumed signal source positions or directions and apply the minimum variance method parallelly. Expensive or vary large-scale hardware is required to realize such processing as just described.

The signal processing apparatus disclosed in Japanese Patent No. 2928873 is designed to extract or separate a wave motion component arriving from a predetermined position, but is not directed to extraction, separation or emphasis of a signal from a direction or a position of a signal source obtained by estimation where the direction or the position of the signal source is unknown and the incoming direction of the signal is unknown.

In summary, with the prior art apparatus and methods described above, where the direction or the position of a signal source is not known in advance and much noise is present or a comparatively great number of signal sources generate signals at a time and particularly the number of signal sources is greater than the number of reception apparatus, the direction or directions or the position or positions of one signal source or a plurality of signal sources cannot be estimated with a sufficient degree of accuracy, and a signal or signals from one signal source or a plurality of signal sources cannot be emphasized sufficiently.

SUMMARY OF THE INVENTION

It is an object of the present invention to provide a signal source direction or position estimation method and apparatus by which the direction in or the position at which a signal source such as a sound source is present can be estimated.

It is another object of the present invention to provide a signal source direction or position estimation method and apparatus by which signals from a plurality of reception apparatus by which a signal or signals from a signal source or a plurality of signal sources are received can be used to estimate the direction or directions or the position or positions of the signal source or sources.

It is a further object of the present invention to provide a signal emphasis method and apparatus by which a signal or signals of a signal source or a plurality of signal sources can be emphasized based on cross correlation functions between signals received by a plurality of reception apparatus.

It is a still further object of the present invention to provide a signal emphasis method and apparatus by which a signal or signals from a signal source or a plurality of signal sources with regard to which the direction or directions in or the position or positions at which they are present are not known in advance can be emphasized using received signals of a plurality of reception apparatus by which the signal or signals from the signal source or sources are received.

In order to attain the objects described above, according to an aspect of the present invention, there is provided a signal processing method for processing a plurality of received signals obtained by receiving a signal or signals from a signal source or a plurality of signal sources through a plurality of reception apparatus, comprising a first step of decomposing each of the received signals into a plurality of different frequency band signals, a second step of calculating cross correlation functions between the different frequency band signals originating from two different ones of the reception apparatus for individual corresponding frequency bands for individual possible combinations of the reception apparatus, and a third step of estimating the direction or directions or the position or positions of the signal source or sources based on the cross correlation functions.

According to the present invention, the signal processing method is performed by a signal processing apparatus for processing a plurality of received signals obtained by receiving a signal or signals from a signal source or a plurality of signal sources through a plurality of reception apparatus, comprising first means for decomposing each of the received signals into a plurality of different frequency band signals, second means for calculating cross correlation functions between the different frequency band signals originating from two different ones of the reception apparatus for individual corresponding frequency bands for individual possible combinations of the reception apparatus, and third means for estimating the direction or directions or the position or positions of the signal source or sources based on the cross correlation functions.

The first means may be formed from a plurality of band-pass filters for passing signals of frequency bands different from each other therethrough.

The third step or means may include a maximum value detection step of or maximum value detection means for determining delay times with which the cross correlation functions exhibit maximum values for the individual frequency bands for the individual combinations of the reception apparatus and setting the determined delay times as candidate delay times, and an estimation step of or estimation means for estimating the number and the direction or directions or the position or positions of the signal source or sources so that the candidate delay times may be provided most consistently.

Alternatively, the third step or means may include a normalization step of or normalization means for normalizing the cross correlation functions for the individual frequency bands, an addition step of or addition means for adding the cross correlation functions normalized for the individual combinations of the reception apparatus over all or some plurality of ones of the frequency bands, and an estimation step of or estimation means for estimating the direction or directions or the position or positions of the signal source or sources based on results of the addition of the normalized cross correlation functions.

The estimation step or means may determine the delay times with which the cross correlation functions added by the addition means exhibit maximum values for the individual combinations of the reception apparatus and set the determined delay times as candidate delay times and then estimate the number and the direction or directions or the position or positions of the signal source or sources with which the candidate delay times are provided most consistently.

The addition step or means may perform, where the nature of the signal or each of the signals from the signal source or sources is known in advance, weighted addition so as to emphasize components originating from the received signals but suppress components which originate from noise.

The signal source or each of the signal sources may be a sound source.

According to another aspect of the present invention, there is provided a signal processing method for processing a signal played back from a recording medium on which a signal or signals received from a signal source or a plurality of signal sources through a plurality of reception apparatus are recorded, comprising a first step of decomposing each of the played back received signals into a plurality of different frequency band signals, a second step of calculating cross correlation functions between the different frequency band signals originating from two different ones of the reception apparatus for individual corresponding frequency bands for individual possible combinations of the reception apparatus, and a third step of estimating the direction or directions or the position or positions of the signal source or sources based on the cross correlation functions.

According to the present invention, the signal processing method is performed by a signal processing apparatus for processing a signal played back from a recording medium on which a signal or signals received from a signal source or a plurality of signal sources through a plurality of reception apparatus are recorded, comprising first means for decomposing each of the played back received signals into a plurality of different frequency band signals, second means for calculating cross correlation functions between the different frequency band signals originating from two different ones of the reception apparatus for individual corresponding frequency bands for individual possible combinations of the reception apparatus, and third means for estimating the direction or directions or the position or positions of the signal source or sources based on the cross correlation functions.

According to a further aspect of the present invention, there is provided a signal processing method for processing a plurality of received signals obtained by receiving a signal or signals from a signal source or a plurality of signal sources through a plurality of reception apparatus, comprising a first step of decomposing each of the received signals into a plurality of different frequency band signals, a second step of calculating cross correlation functions between the different frequency band signals originating from two different ones of the reception apparatus for individual corresponding frequency bands for individual possible combinations of the reception apparatus, a third step of estimating delay times of individual ones of the reception apparatus which depend upon the direction or directions or the position or positions of the signal source or sources and an arrangement of the reception apparatus based on cross correlation functions, and a fourth step of delaying the different frequency band signals of the received signals individually using the estimated delay times and adding the delayed different frequency band signals.

According to the present invention, the signal processing method is performed by a signal processing apparatus for processing a plurality of received signals obtained by receiving a signal or signals from a signal source or a plurality of signal sources through a plurality of reception apparatus, comprising first means for decomposing each of the received signals into a plurality of different frequency band signals, second means for calculating cross correlation functions between the different frequency band signals originating from two different ones of the reception apparatus for individual corresponding frequency bands for individual possible combinations of the reception apparatus, third means for estimating delay times of individual ones of the reception apparatus which depend upon the direction or directions or the position or positions of the signal source or sources and an arrangement of the reception apparatus based on cross correlation functions, and fourth means for delaying the different frequency band signals of the received signals individually using the estimated delay times and adding the delayed different frequency band signals.

The first means may be formed from a plurality of band-pass filters for passing signals of frequency bands different from each other therethrough.

The third step or means may include a maximum value detection step of or maximum value detection means for determining delay times with which the cross correlation functions exhibit maximum values for the individual frequency bands for the individual combinations of the reception apparatus and setting the determined delay times as candidate delay times, and an estimation step of or estimation means for estimating the direction or directions or the position or positions of the signal source or sources so that the candidate delay times may be provided most consistently and estimating the delay times of the individual ones of the reception apparatus based on the estimated direction or directions or the estimated position or positions of the signal source or sources.

Alternatively, the third step or means may include a normalization step of or normalization means for normalizing the cross correlation functions for the individual frequency bands, an addition step of or addition means for adding the cross correlation functions normalized for the individual combinations of the reception apparatus over all or some plurality of ones of the frequency bands, and an estimation step of or estimation means for estimating the delay times of the individual ones of the reception apparatus based on results of the addition of the normalized cross correlation functions.

The estimation step or means may determine the delay times with which the cross correlation functions added by the addition means exhibit maximum values for the individual combinations of the reception apparatus, set the determined delay times as candidate delay times, estimate the number and the direction or directions or the position or positions of the signal source or sources with which the candidate delay times are provided most consistently, and then estimate the delay times of the individual ones of the reception apparatus based on the estimated direction or directions or the estimated position or positions.

The addition step or means may perform, where the nature of the signal or each of the signals from the signal source or sources is known in advance, weighted addition so as to emphasize components originating from the received signals but suppress components which originate from noise.

The fourth step or means may determine, upon the addition of the delayed different frequency band signals, weighting coefficients for the individual frequency bands based on values of the cross correlation functions between the different frequency band signals for the estimated delay times and use the weighting coefficients to perform weighted addition.

The signal source or each of the signal sources may be a sound source.

According to a still further aspect of the present invention, there is provided a signal processing method for processing a signal played back from a recording medium on which a signal or signals received from a signal source or a plurality of signal sources through a plurality of reception apparatus are recorded, comprising a first step of decomposing each of the played back received signals into a plurality of different frequency band signals, a second step of calculating cross correlation functions between the different frequency band signals originating from two different ones of the reception apparatus for individual corresponding frequency bands for individual possible combinations of the reception apparatus, a third step of estimating delay times of individual ones of the reception apparatus which depend upon the direction or directions or the position or positions of the signal source or sources and an arrangement of the reception apparatus based on cross correlation functions, and a fourth step of delaying the different frequency band signals of the received signals individually using the estimated delay times and adding the delayed different frequency band signals.

According to the present invention, the signal processing method is performed by a signal processing apparatus for processing a signal played back from a recording medium on which a signal or signals received from a signal source or a plurality of signal sources through a plurality of reception apparatus are recorded, comprising first means for decomposing each of the played back received signals into a plurality of different frequency band signals, second means for calculating cross correlation functions between the different frequency band signals originating from two different ones of the reception apparatus for individual corresponding frequency bands for individual possible combinations of the reception apparatus, third means for estimating delay times of individual ones of the reception apparatus which depend upon the direction or directions or the position or positions of the signal source or sources and an arrangement of the reception apparatus based on cross correlation functions, and fourth means for delaying the different frequency band signals of the received signals individually using the estimated delay times and adding the delayed different frequency band signals.

In the signal processing apparatus and methods, a signal or signals from a signal source or a plurality of signal sources are received by a plurality of reception apparatus, and the received signals are decomposed into signals of different frequency bands by a plurality of band-pass filters. Then, cross correlation functions between the different frequency band signals originating from two different ones of the reception apparatus are calculated for individual combinations of the reception apparatus for the individual corresponding frequency bands. If the power of noise having no directivity is high in some of the frequency bands, then the cross correlation functions of the frequency band do not exhibit a maximum value, and therefore, an influence of the noise can be suppressed effectively when delay times of the individual reception apparatus which depend upon the direction or directions or the position or positions of the signal source or sources or upon the direction or directions or the position or positions of the signal source or sources and the arrangement of the reception apparatus are estimated.

On the other hand, even if the power of noise having no directivity is high in all of the frequency bands, in any frequency band in which a signal from a signal source is present, unless the signal is canceled by the noise within the frequency band, the cross correlation functions of the frequency band have maximum values in the delay times of the reception apparatus which depend upon the direction or the position of the signal source and the arrangement of the reception apparatus. Therefore, the delay times of the individual reception apparatus which depend upon the direction or the position of the signal source or upon the direction or the position of the signal source and the arrangement of the reception apparatus can be estimated.

However, if the noise has some directivity, then also the noise can be regarded as one of signal sources, and the delay times of the reception apparatus which depend upon the direction or the position of the signal source or upon the direction or the position of the signal source and the arrangement of the reception apparatus can be estimated.

If the method of estimating the direction or the position of a signal source from cross correlation functions or the method of estimating the delay times of individual reception apparatus which depend upon the direction or the position of a signal source and the arrangement of the reception apparatus utilizes the method of normalizing the cross correlation functions for individual frequency bands and adding the cross correlation functions normalized for individual combinations of the reception apparatus over all or some plurality of ones of frequency bands, then where the signal exhibits power levels different among the different frequency bands, even information of a frequency band in which the power level is low can be utilized effectively without being disturbed by a signal of another frequency band in which the power level is high. Consequently, the accuracy in estimation of the delay times of the different reception apparatus which depend upon the direction or the position of the signal source or upon the direction or the position of the signal source and the arrangement of the reception apparatus can be raised.

Further, where the method of adding the cross correlation functions normalized for the individual combinations of the reception apparatus over a plurality of frequency bands is used, since the delay times with which the added cross correlation functions exhibit a maximum value are determined for the individual combinations of the reception apparatus and are set as candidate delay times. Therefore, when compared with another method which does not use such addition, the number of candidate delay times can be reduced. In particular, the calculation amount in estimation of the number and the directions or the positions of the signal sources with which the candidate delay times are provided most consistently can be decreased, or the scale of hardware necessary for such calculation can be reduced.

In the addition of the cross correlation functions described above, where the nature of the signal or noise is known in advance, by performing weighted addition so as to emphasize components originating from the signal but suppress components which originate from the noise, the accuracy in estimation of the delay times of the different reception apparatus which depend upon the direction or the position of the signal source or upon the direction or the position of the signal source and the arrangement of the reception apparatus can be further raised.

If the present invention is applied to signal emphasis, where, upon the addition of the delayed different frequency band signals, weighting coefficients for the individual frequency bands are determined based on values of the cross correlation functions between the different frequency band signals for the estimated delay times and the weighting coefficients are used to perform weighted addition, although there is a drawback that some distortion occurs, the influence of noise or some other signal source can be reduced, and emphasis can be performed manifestly.

In summary, according to the present invention, a superior signal source direction or position estimation method and apparatus can be provided wherein signals from a plurality of reception apparatus when the reception apparatus receive a signal or signals from a signal source or a plurality of signal sources with regard to which the direction or directions or the position or positions in which the signal source or sources are present are not known in advance can be used to estimate the direction or directions or the position or positions of the signal source or sources.

Further, according to the present invention, a superior signal emphasis method and apparatus can be provided wherein a signal or signals from a signal source or a plurality of signal sources with regard to which the direction or directions or the position or positions in which the signal source or sources are present are not known in advance can be emphasized using signals received by a plurality of reception apparatus.

According to the present invention, since received signals from a plurality of reception apparatus which receive a signal or signals from a signal source or a plurality of signal sources are decomposed into a plurality of different frequency band signals by a plurality of band-pass filters and cross correlation functions between the different frequency band signals are calculated for individual combinations of the reception apparatus for the individual corresponding frequency bands and then the direction or directions or the position or positions of the signal source or sources are estimated based on the cross correlation functions, even where significant noise is present or a plurality of signal sources generate signals at the same time, the direction or directions or the position or positions of the signal source or sources can be estimated sufficiently.

According to the present invention, since received signals from a plurality of reception apparatus which receive a signal or signals from a signal source or a plurality of signal sources are decomposed into a plurality of different frequency band signals by a plurality of band-pass filters and cross correlation functions between the different frequency band signals are calculated for individual combinations of the reception apparatus for the individual corresponding frequency bands and then the delay times of the individual reception apparatus which depend upon the direction or directions or the position or positions of the signal source or sources and the arrangement of the reception apparatus are estimated based on the cross correlation functions, whereafter the different frequency band signals of the received signals are delayed individually using the estimated delay times and the delayed different frequency band signals are added to emphasize the signal or signals of the signal source or sources, even where significant noise is present or a plurality of signal sources generate signals at the same time, the signal of the signal source or each of the signal sources can be emphasized.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

[First Embodiment]

Figure 1:
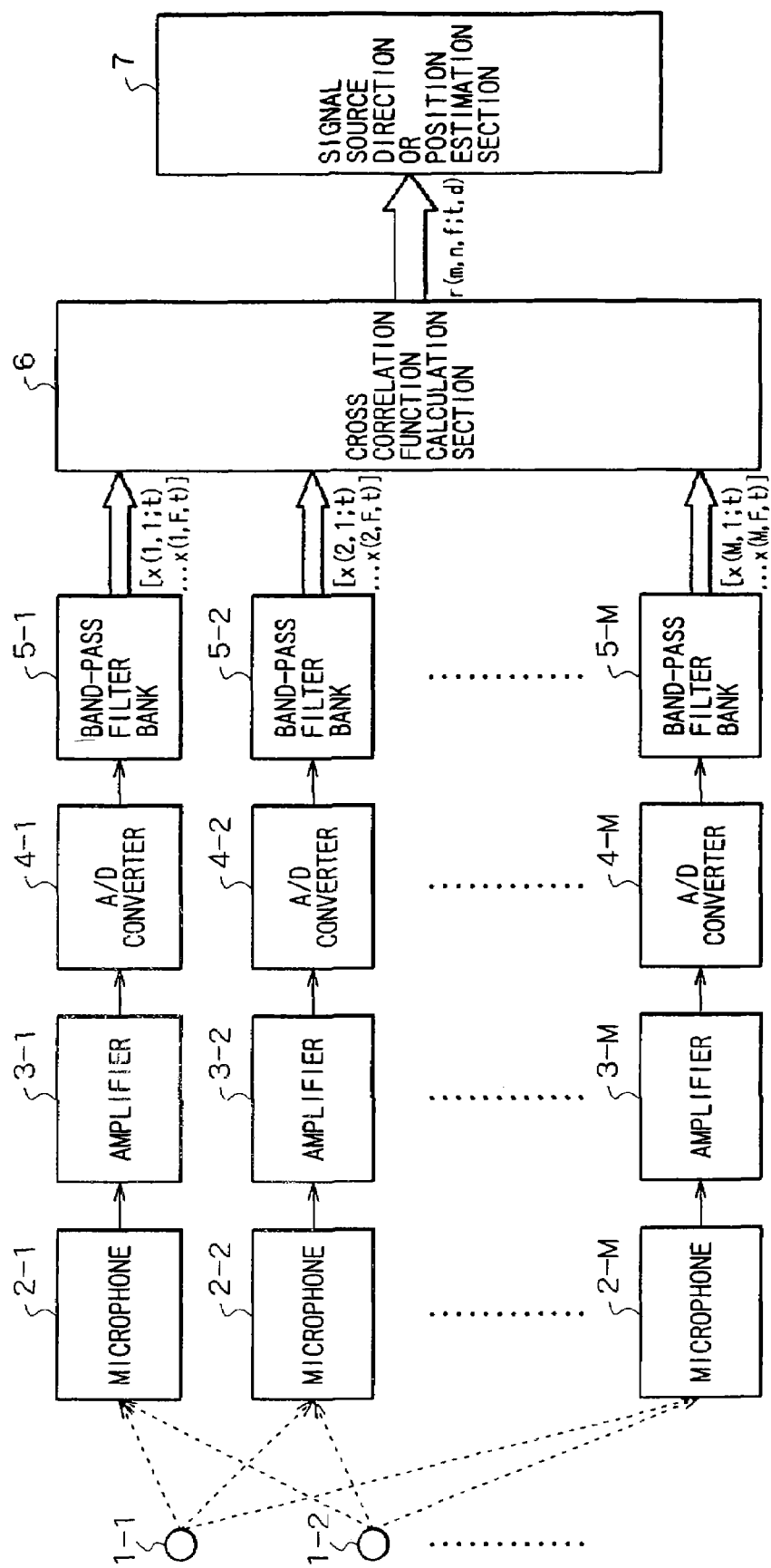
FIG. 1 is a block diagram schematically showing a configuration of a signal processing apparatus to which the present invention is applied.

Referring first to FIG. 1, there is shown a functional configuration of a signal processing apparatus to which the present invention is applied. The signal processing apparatus includes a plurality of (in the embodiment shown, M) reception systems composed of a plurality of (M) microphones 2-1, 2-2, . . . , 2-M for receiving a signal or signals generated from one or more signal sources 1-1, 1-2, . . . , M amplifiers 3-1, 3-2, . . . , 3-M for amplifying the received signals of the microphones 2-1, 2-2, . . . , 2-M, respectively, M A/D converters 4-1, 4-2, . . . , 4-M for converting the amplified signals from the amplifiers 3-1, 3-2, . . . , 3-M into digital signals, respectively, and M band-pass filter banks 5-1, 5-2, . . . , 5-M, respectively, a cross correlation function calculation section 6 for calculating cross correlation functions between frequency band signals for individual combinations of the reception systems for individual frequency bands, and a signal source direction or position estimation section 7 for estimating the direction or directions or the position or positions of the signal source or sources based on the calculated cross correlation functions.

Signals received by the microphones 2-1, 2-2, ..., 2-M and amplified by the amplifiers 3-1, 3-2, ..., 3-M are converted into digital signals by the A/D converters 4-1, 4-2, ..., 4-M, respectively, to obtain digital received signals x(m; t). Here, m (=1, 2, ..., M) represents a reference number for identification of a microphone, and t (=1, 2, ...) represents the time represented in a unit of a sampling period selected so as not to deteriorate the signal.

Then, the received signals x(m, t) obtained by the analog to digital conversion are inputted to the band-pass filter bank sections 5-$m$ (m=1, 2, ..., M). Each of the band-pass filter bank sections 5-$m$ is formed from a plurality of band-pass filters and can decompose an amplified and digitally converted received signal into a plurality of different frequency band signals. Here, an amplified and digitally converted received signal is decomposed into and outputted as F (>1) different band signals x(m, 1; t), x(m, 2; t), ..., x(m, F; t). F represents the number of banks of each filter bank section.

Then, the M×F different band signals x(m, f; t) (m=1, 2, ..., M; f=1, 2, ..., F) are inputted to the cross correlation function calculation section 6. The cross correlation function calculation section 6 calculates and outputs, for individual combinations (m, n) of two different microphones, cross correlation functions r(m, n, f; t; d) (m=1, 2, ..., M−1; n=m+1, m+2, ..., M; f=1, 2, ..., F; d=−T, −T+1, ..., T) for corresponding different frequency bands. Here, d (=−T, −T+1, ..., T) represents the delay time by which x(m, f, t) are delayed with reference to digital received signals x(n, f; t), and T represents the maximum delay time which is determined from the distance between microphones, the speed of the signal, and the sampling period as hereinafter described.

Then, the thus calculated M×(M−1)×F/2 different frequency band cross correlation functions r(m, n, f; t; d) (m=1, 2, ..., M−1; n=m+1, m+2, ..., M; t=1, 2, ...; d=−T, −T+T, ..., T) are inputted to the signal source direction or position estimation section 7. The signal source direction or position estimation section 7 thus estimates and outputs the direction or directions or the position or positions of the signal source or sources.

Figure 2:
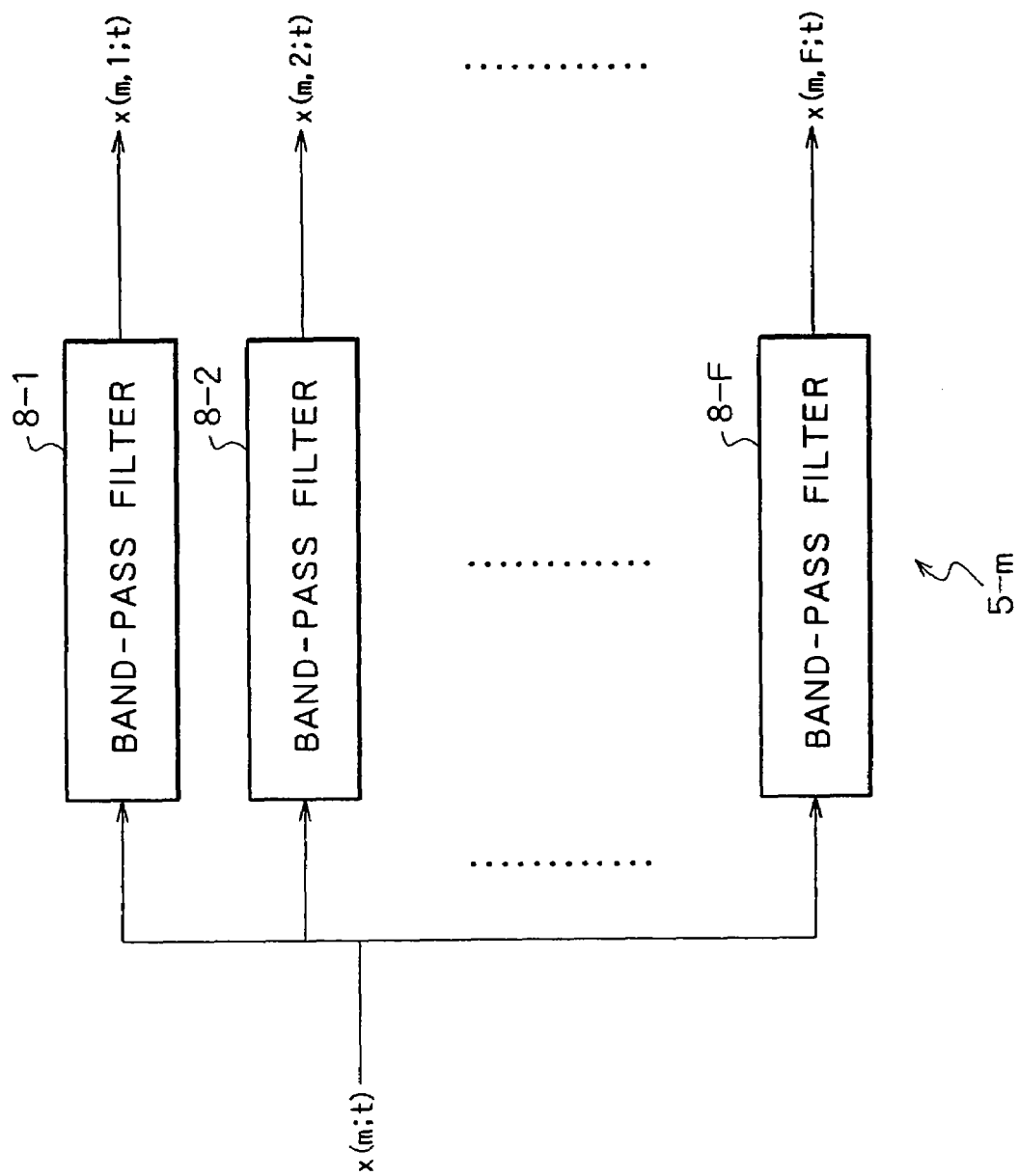
FIG. 2 is a block diagram showing an internal configuration of a band-pass filter bank section of the signal processing apparatus of FIG. 1.

FIG. 2 shows an internal configuration of the band-pass filter bank section 5-$m$. Referring to FIG. 2, the band-pass filter bank 5-$m$ includes F band-pass filters 8-1, 8-2, ..., 8-F which take charge of frequency bands different from one another. Each of the band-pass filters 8-1, 8-2, ..., 8-F is formed from, for example, a digital filter.

A signal x(m; t) which originates from a received signal from the mth microphone 2-$m$ is filtered by the F band-pass filters 8-1, 8-2, ..., 8-F which take charge of the frequency bands different from one another so that it is decomposed into and outputted as F signals x(m, f; t) (f=1, 2, ..., F) of the different frequency bands.

Figure 3:
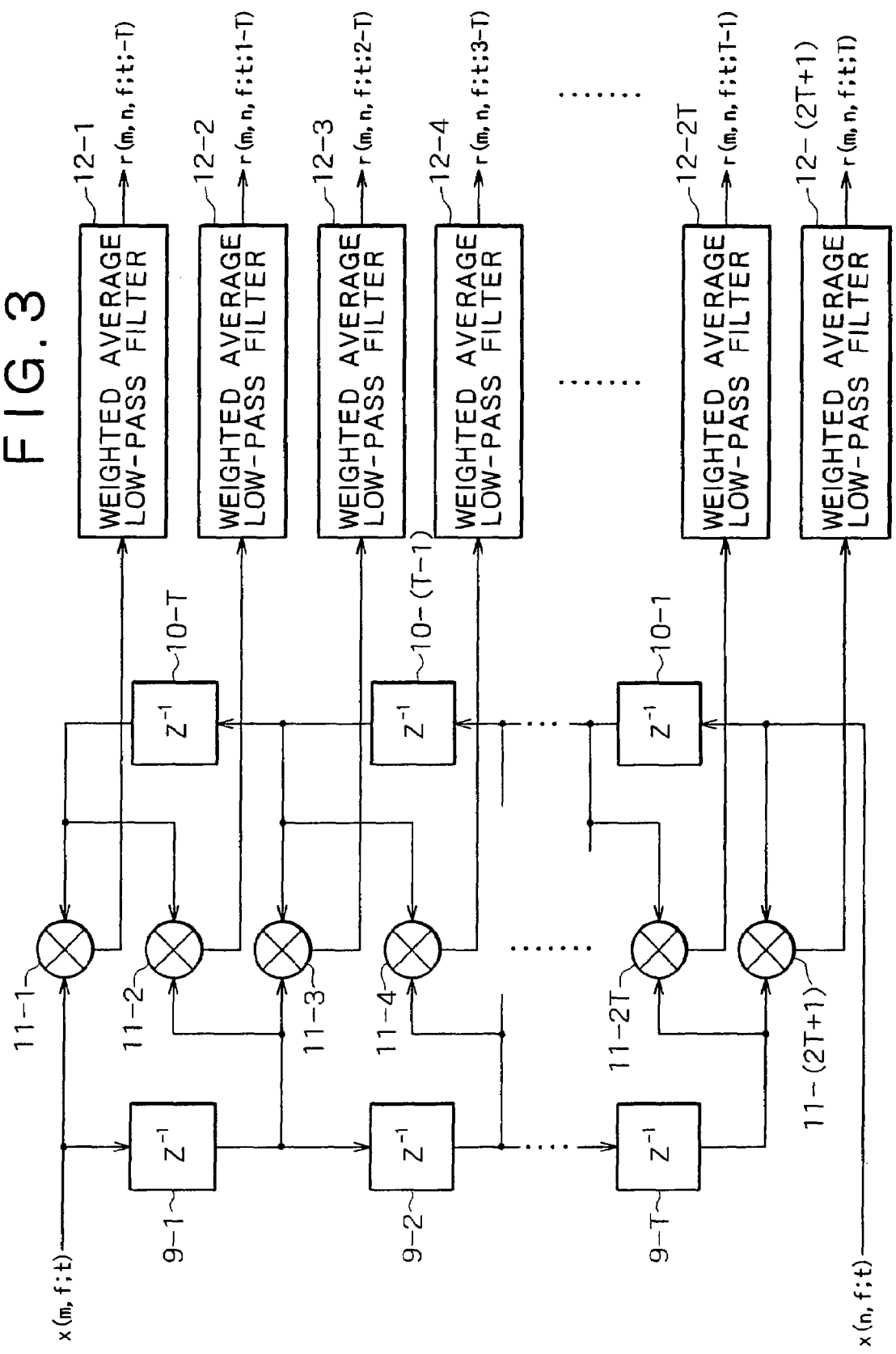
FIG. 3 is a block diagram showing an internal configuration of a cross correlation function calculation section of the signal processing apparatus of FIG. 1.

FIG. 3 shows an internal configuration of the cross correlation function calculation section 6. More particularly, FIG. 3 shows those elements of the cross correlation function calculation section 6 which participate in calculation of cross correlation functions between received signals from the mth microphone 2-$m$ and the nth microphone 2-$n$.

The different band signals x(m, f; t) and x(n, f; t) (m=1, 2, ..., M−1; n=m+1, m+2, ... M; f=1, 2, ..., F) of the fth frequency band of the received signals from the mth microphone 2-$m$ and the nth microphone 2-$n$ are successively inputted to T delay units 9-1, 9-2, ..., 9-T and 10-1, 10-2, ..., 10-T, respectively.

The two signals individually delayed by predetermined amounts by the delay units 9-1, 9-2, ..., 9-T and 10-1, 10-2, ..., 10-T are multiplied by each other by integrators 11-1, 11-2, ..., 11-(2T+1) and further inputted to low pass filter 12-1, 12-2, ..., 12-(2T+1), by which they are weighted time averaged. Resulting values of the weighted time averaging are outputted as 2T+1 values of cross correlation functions r(m, n, f; t; d) for each time of the different band signals from the mth microphone 2-$m$ and the nth microphone 2-$n$ for the fth frequency band.

The number T of the delay units is selected such that, where the distance between the mth microphone 2-$m$ and the nth microphone 2-$n$ is represented by D(m, n) and the velocity of the signals is represented by c, where the sampling period is used as a unit of time, T~D(m, n)/c may be satisfied. In order to simplify processing in the later process or for some other object, a number of delay units greater than T may be provided. In this instance, however, a delay time longer than the time D(m, n)/c within which a signal advances over the distance D(m, n) between the microphones is provided, and this is physically redundant.

Subsequently, an internal configuration and an operation characteristic of the signal source direction or position estimation section 7 are described. It is to be noted that the internal configuration and the operation are different depending upon whether the number M of microphones is 2 or three or more as hereinafter described.

Figure 4:
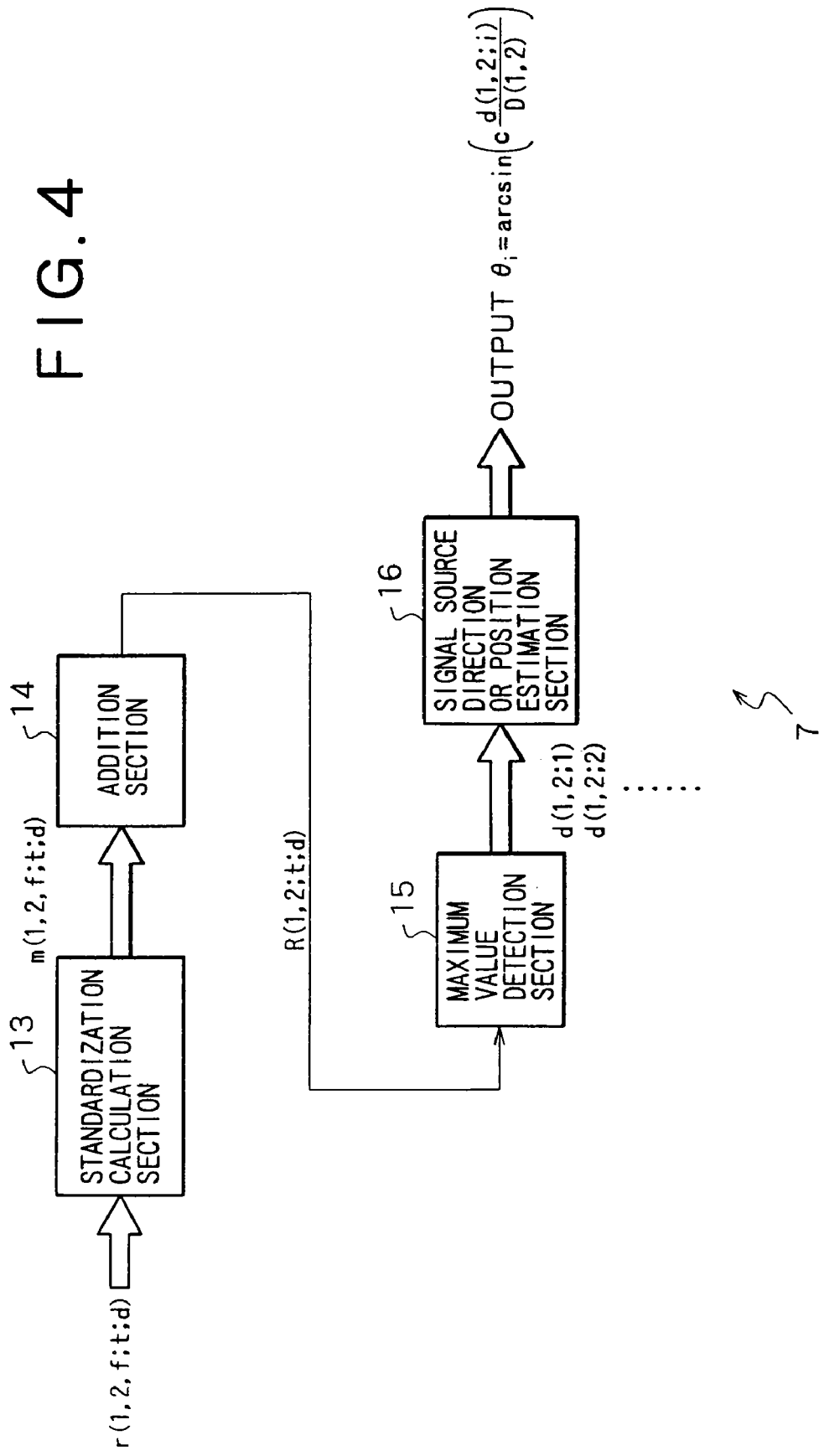
FIG. 4 is a block diagram showing an internal configuration of a signal source direction or position estimation section of the signal processing apparatus of FIG. 1 where the number of microphones is 2.

FIG. 4 shows an internal configuration of the signal source direction or position estimation section 7 where the number M of microphones is 2.

In the signal source direction or position estimation section 7 shown in FIG. 4, the number of sets of two different microphones is only one as denoted by reference characters 1-1 and 1-2, and therefore, F cross correlation functions r(1, 2, f; t; d) (f=1, 2, ..., F) are inputted to the signal source direction or position estimation section 7. The cross correlation functions are normalized for each frequency band by a normalization calculation section 13 and outputted as normalized cross correlation functions rn(1, 2, f; t; d) (f=1, 2, ..., F).

The normalized cross correlation functions rn(1, 2, f; t; d) can be calculated by determining the maximum value or the variance of the cross correlation functions r(1, 2, f; t; d) with respect to the delay time d and dividing the cross correlation functions r(1, 2, f; t; d) by the thus determined value.

Then, the normalized cross correlation functions rn(1, 2, f; t; d) (f=1, 2, ..., F) are inputted to an addition section 14, by which they are added with regard to the numbers f of the filters. Then, resulting values are outputted as added cross correlation functions R(1, 2; t; d).

In this instance, the addition is preferably performed with regard to all filter numbers. Or, where a frequency band in which a signal or noise is included is known in advance, the addition may be performed only with regard to numbers corresponding to some plurality of frequency bands which include a signal or do not include noise, or weighted addition may be performed so as to emphasize components originating from signals to suppress components originating from noise.

Then, the added cross correlation functions R(1, 2; t; d) are inputted to a maximum value detection section 15, and the maximum value detection section 15 detects and outputs delay times d(1, 2; 1), d(1, 2; 2), ... which provide maximum values with regard to the delay time d.

Such maximum value detection may be performed, in order to eliminate detection of an insignificant maximum value which does not correspond to a signal source, using it as a condition that the maximum value reaches or exceeds a threshold value which is set in advance or is set using a statistic value such as an average or a variance of the added cross correlation functions R(1, 2; t; d).

Then, the delay times d(1, 2; 1), d(1, 2; 2), ... are inputted to a signal source direction or position estimation section 16, and the signal source direction or position estimation section 16 calculates and outputs the directions θ1, θ2, ... of the signal source corresponding to the individual delay times in accordance with the following expression:

$$\theta i = arc \sin[c \cdot d(1, 2; i)/D(1, 2)] (i=1, 2, \ldots) \qquad (1)$$

Figure 5:
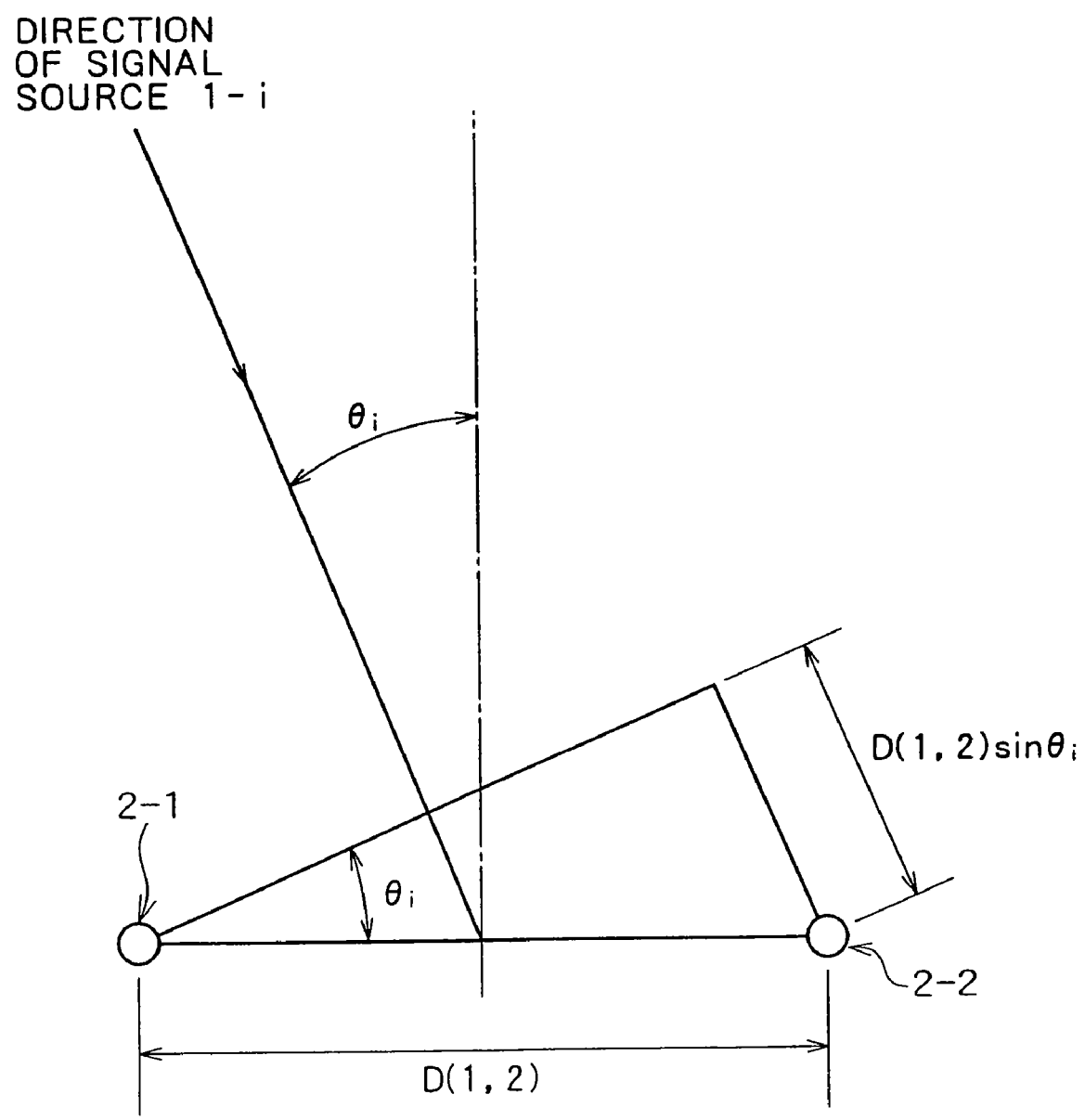
FIG. 5 is a diagrammatic view illustrating an expression used for signal source direction estimation by the signal processing apparatus of FIG. 1.

FIG. 5 illustrates the expression (1) above used for signal source direction estimation. It is to be noted that FIG. 5 illustrates the expression (1) applied to a plane which passes the two microphones 2-1 and 2-2 and the signal source or sources 1-i.

Where two microphones are involved, it is mathematically impossible to estimate the position of a signal source from the delay times d(1, 2; i), and only it is possible to estimate the direction of the signal source. In this instance, it is assumed that the signal source is spaced sufficiently far away from the two microphones when compared with the distance D(1, 2) between the two microphones, and it is approximated that a signal is described with a plane wave.

It is assumed that the signal source 1-i is present in the direction of θi with reference to a direction perpendicular to such a straight line formed from the microphones 2-1 and 2-2 as shown in FIG. 5. In this instance, the sign of θi is defined such that the direction where the signal source is present on the microphone 2-1 side is the positive direction, and where the signal source is present on the microphone 2-2 side is the negative direction. Accordingly, in the example shown in FIG. 5, θi>0.

In the example illustrated in FIG. 5, where the velocity of a signal is represented by c, a signal from the signal source 1-i arrives at the microphone 2-1 earlier, and arrives at the microphone 2-2 later by D(1, 2)sin θi/c.

Accordingly, if those components of the signals x(1; t) and x(2; t) received by the microphones 2-1 and 2-2 which originate from the signal source 1-i are defined as xs(1, i; t) and xs(2, i; t), respectively, then if attention is paid to the time delay and if a difference in amplitude is ignored, then the following equation stands:

$$xs(1, i; t) \sim xs(2, i; t+D(1, 2)\sin \theta i/c) \qquad (2)$$

If it is assumed that the delay time d(1, 2; i) detected as a maximum value of the added cross correlation function R(1, 2; t; d) corresponds to the signal source 1-i, then $$d(1, 2; i) = D(1, 2)\sin \theta i/c \qquad (3)$$

and by deforming this, the expression (1) given hereinabove can be obtained.

It is to be noted that, from an influence of noise or an influence of sampling, such a situation that the absolute value |c·d(1, 2, i)/D(1, 2)| of c·d(1, 2, i)/D(1, 2) exceeds 1 and arcsin of this cannot be determined within the range of real numbers may possibly occur. In this instance, θi may be estimated that, when d(1, 2; i) is in the positive, θi=π/2=90°, but when d(1, 2; i) is in the negative, θi=−π/2=−90°.

Figure 6:
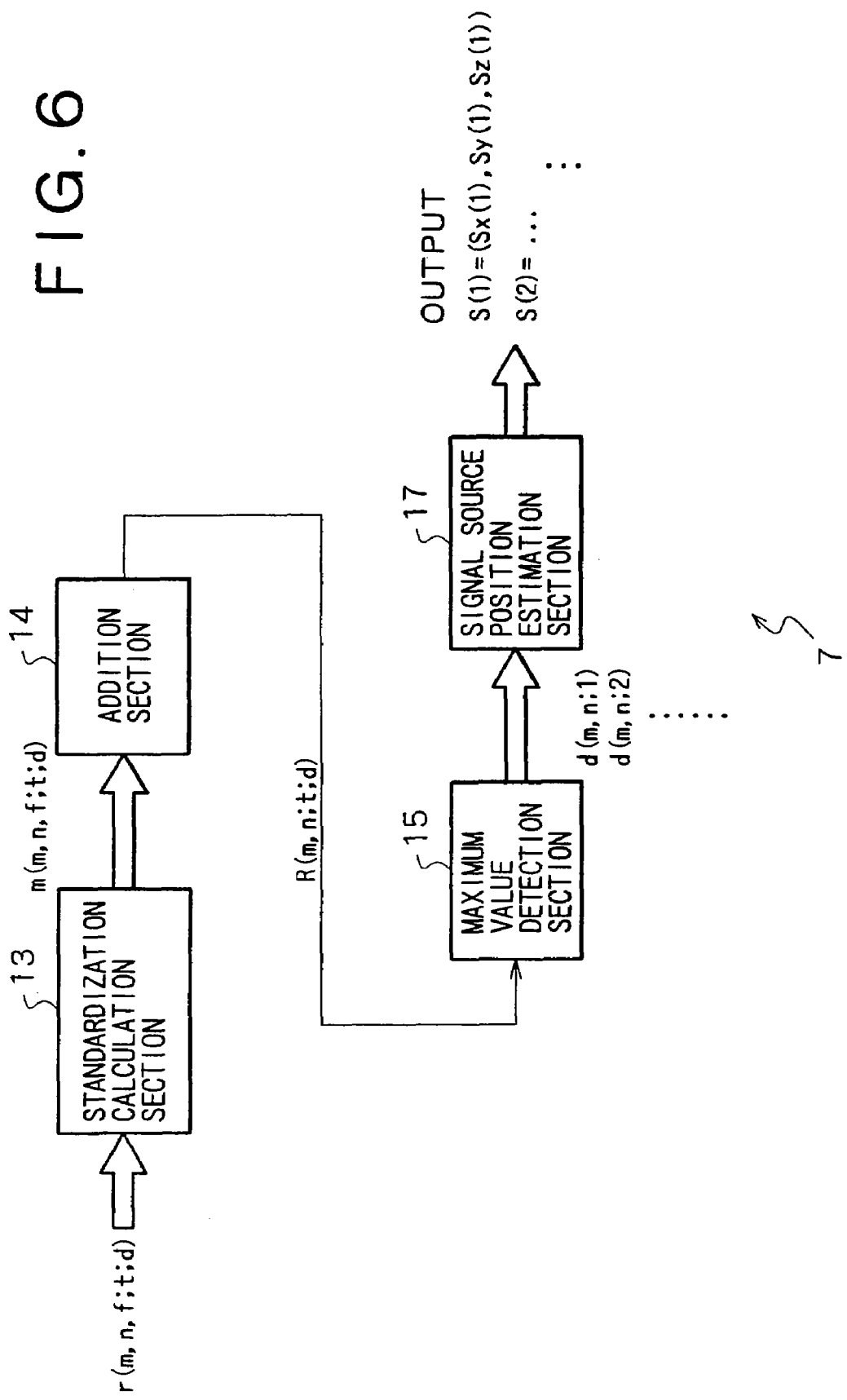
FIG. 6 is a block diagram showing an internal configuration of the signal source direction or position estimation section of the signal processing apparatus of FIG. 1 where the number of microphones is 3 or more.

Now, an internal configuration and operation of the signal source direction or position estimation section 7 where the number M of microphones is 3 or more are described with reference to FIG. 6.

Similarly as in the case wherein the number of microphones is 2 (refer to FIG. 4), cross correlation functions r(m, n, f; t; d) (m=1, 2, ..., M−1; n=m+1, m+2, ..., M; f=1, 2, ..., F) are inputted to the normalization calculation section 13, and the normalization calculation section 13 normalizes the cross correlation functions r(m, n, f; t; d) for the individual frequency bands and outputs resulting functions as normalized cross correlation functions rn(m, n, f; t; d) (m=1, 2, ..., M−1; n=m+1, m+2, ..., M; f=1, 2, ..., F).

The normalized cross correlation functions rn(m, n, f; t; d) are calculated by determining such a value as a maximum value or a variance of the cross correlation functions r(m, n, f; t; d) with regard to the delay time d and dividing the cross correlation functions r(m, n, f; t; d) by the determined value.

Then, the normalized cross correlation functions rn(m, n, f; t; d) (m=1, 2, ..., M−1; n=m+1, m+2, ..., M; f=1, 2, ..., F) are inputted to the addition section 14. The addition section 14 adds the normalized cross correlation functions rn(m, n, f; t; d) with regard to the reference numbers f of the filters and outputs resulting values as added cross correlation functions R(m, n; t; d)(m=1, 2, ..., M; n=m+1, m+2, ..., M).

Normally, the addition by the addition section 14 is preferably performed with regard to all filter numbers. Or, where a frequency band in which a signal or noise is included is known in advance, the addition may be performed only with regard to numbers corresponding to some plurality of frequency bands which include a signal or do not include noise, or weighted addition may be performed so as to emphasize components originating from signals to suppress components originating from noise.

Then, the added cross correlation functions R(m, n; t; d) (m=1, 2, ..., M; n=m+1, m+2, ..., M) are inputted to the maximum value detection section 15. The maximum value detection section 15 detects and outputs delay times d(m, n; 1), d(m, n; 2), ... (m=1, 2, ..., M; n=m+1, m+2, ..., M) which provide maximum values with regard to the delay time d.

Such maximum value detection may be performed, in order to eliminate detection of an insignificant maximum value which does not correspond to a signal source, using it as a condition that the maximum value reaches or exceeds a threshold value which is set in advance or is set using a statistic value such as an average or a variance of the added cross correlation functions R(m, n; t; d).

Then, the delay times d(m, n; i) (m=1, 2, ..., M−1; n=m+1, m+2, ..., M; i=1, 2, ...) are inputted to a signal source position estimation section 17. The signal source position estimation section 17 calculates and outputs S(1)= (Sx(1), Sy(1), Sz(1)), S(2)=(Sx(2), Sy(2), Sz(2)), ... of the signal source corresponding to the respective delay times.

Figure 7:
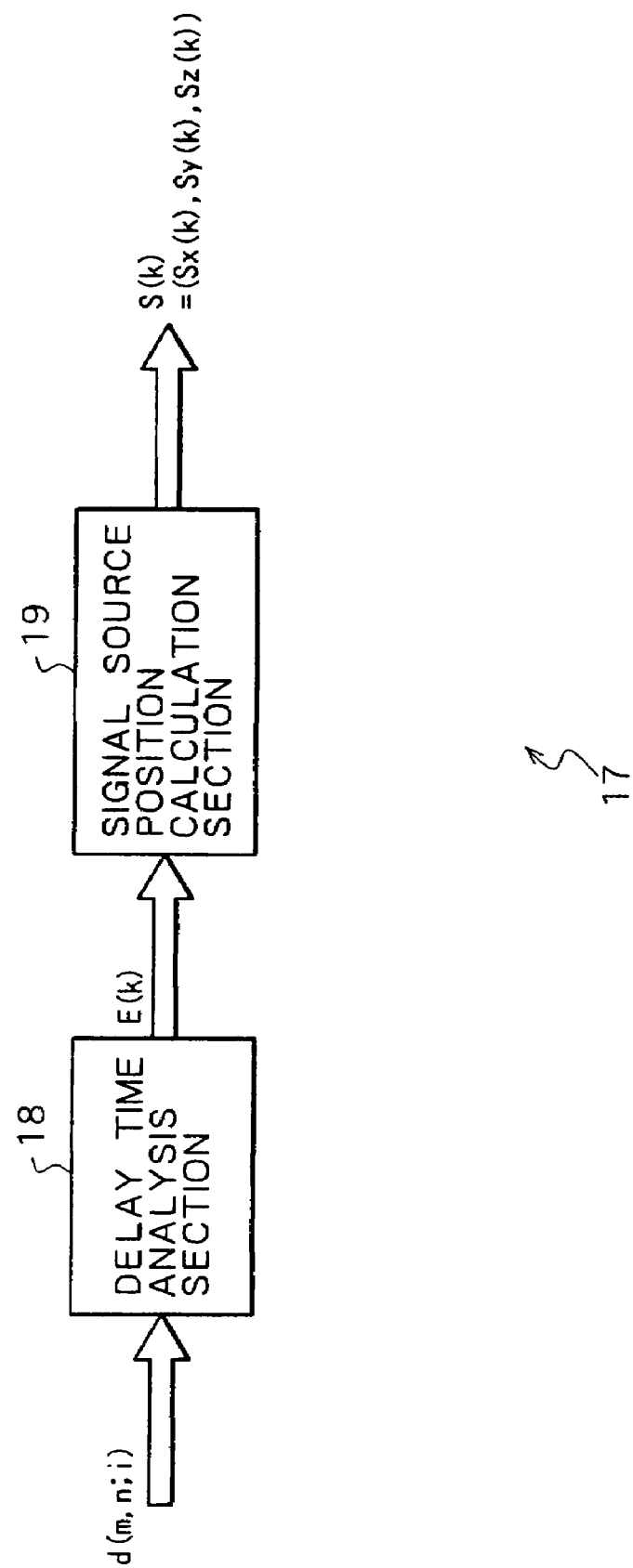
FIG. 7 is a block diagram showing an internal configuration of the signal source direction or position estimation section of the signal processing apparatus of FIG. 1.

FIG. 7 shows an internal configuration of the signal source position estimation section 17.

The delay times d(m, n; i) (m=1, 2, ..., M−1; n=m+1, m+2, ..., M; i=1, 2, ...) are inputted to a delay time analysis section 18, by which they are classified into sets E(k)={d(m1, m2; k), d(m1, m3; k), ..., d(m2, m3; k), ..., d(mi, mj; k)} (k=1, 2, ...) for the individual estimated signal sources.

In this instance, the number i for distinction of different ones of the delay times d(m, n; i) is replaced suitably such that it may coincide with the number k for distinction of different ones of the estimated signal sources. This classification is performed such that, when delay times d(n1, n2; k), d(n1, n3; k), d(n2, n3; k) between received signals of three sets (n1, n2), (n1, n3), (n2, n3) of two different microphones produced from factors of a set (n1, n2, n3) (where n1<n2<n3) of three different microphones are selected arbitrarily from the set E(k) corresponding to a certain one signal source, the following conditional expression is satisfied:

$$|d(n1, n2; k) + d(n2, n3; k) - d(n1, n3; k)| < \epsilon \quad (4)$$

where |a| represents the absolute value of a, and $\epsilon$ is selected to a small number of 1, 2, 3 or so.

In order to perform the classification described above, for example, a procedure of successively searching for a set of delay times which satisfy the expression (4) above with regard to all sets (n1, n2, n3) ($1 \leq n1 < n2 < n3 \leq M$) of the numbers of the different microphones, join those sets which include a common delay time and remove the common delay time should be repeated.

Figure 8:
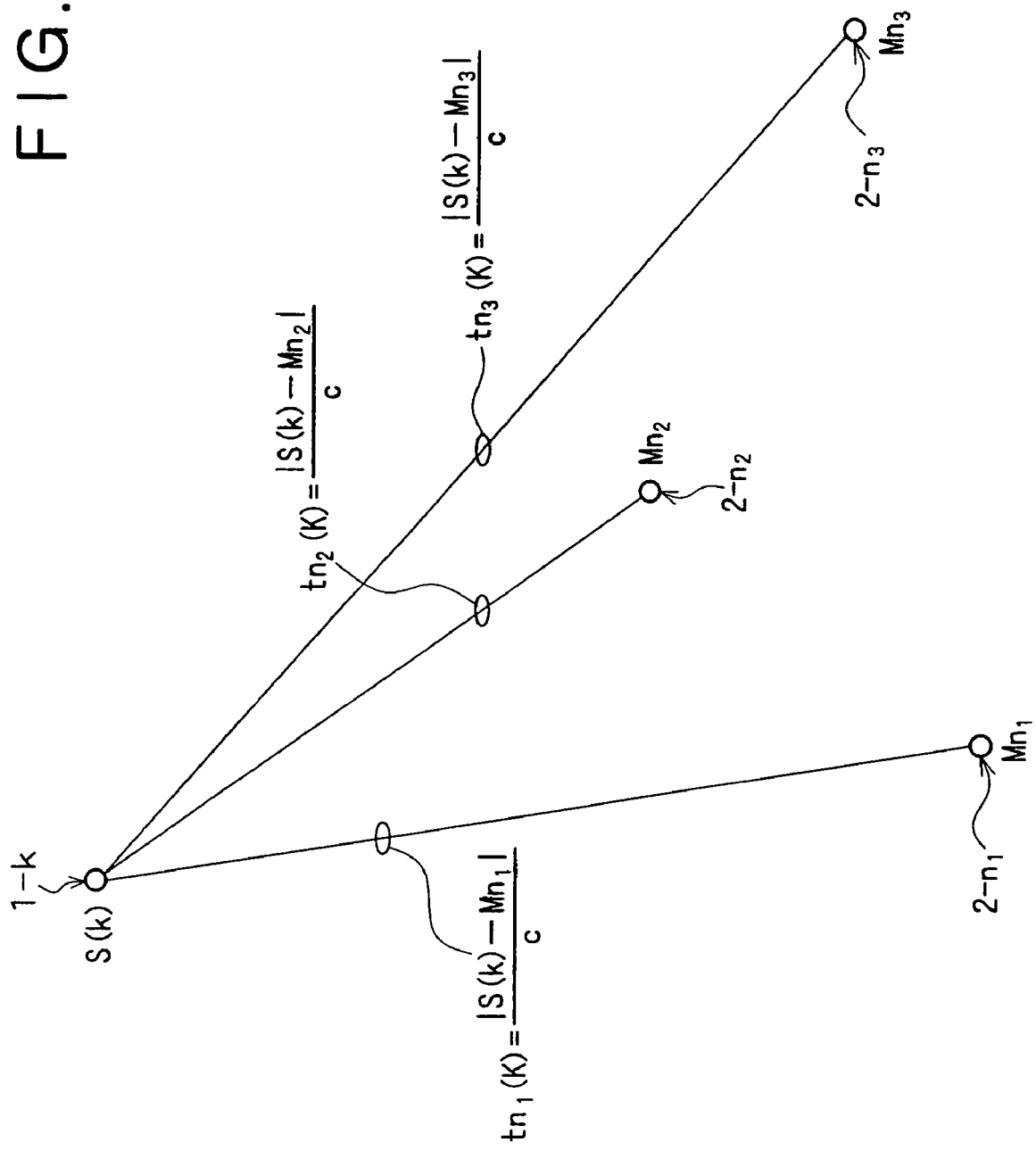
FIG. 8 is a diagrammatic view illustrating another expression used in the signal processing apparatus of FIG. 1.

FIG. 8 illustrates the expression (4) given hereinabove.

If it is assumed that the signal source 1-k is positioned at S(k) and a signal generated from the signal source 1-k arrives at the microphones 2-n1, 2-n2, 2-n3 positioned at positions Mn1, Mn2, Mn3, respectively, then the times required are tn1(k)=|S(k)−Mn1|/c, tn2(k)=|S(k)−Mn2|/c, tn3(k)=|S(k)−Mn3|/c, respectively, where |A| represents the magnitude of the vector A.

The delay time d(ni, nj, k) (ni, nj=n1, n2, n3) is d(ni, nj; k)=tnj(k)−tni(k). It can be seen that, if this is substituted into the left side of the expression (4) given hereinabove, then it becomes equal to 0.

The expression (4) given hereinabove represents that, taking it into consideration that, in the estimation of the delay times d(ni, nj; k) (ni, nj=n1, n2, n3), the value of the left side of the expression (4) may not possibly become equal to zero because of an error produced by an influence of noise or an influence of sampling, if the delay time d(ni, nj; k) is smaller than a certain low value $\epsilon$, then the sounds originate from the same signal source k.

Then, the sets E(k) (k=1, 2, . . . ) of delay times classified for the individual signal sources are inputted to a signal source position calculation section 19. The signal source position calculation section 19 calculates and outputs the positions S(k)=(Sx(k), Sy(k), Sz(k)) (k=1, 2, . . . ) of the signal sources.

One of calculation methods of a signal source position is to calculate, representing the position of the ith microphone 1-i as Mi=(Mxi, Myi, Mzi), the square of [|Mmj−S(k)|/c−|Mmi−S(k)|/c−d(mi, mj; k)] for each element d(mi, mj; k) of E(k), add all of the calculated values and determine S(k) which minimizes the sum value.

Subsequently, the reason why S(k) is calculated correctly by such a calculation method of the signal source position as described above is described.

If it is assumed that a signal from the signal source 1-k arrives at the microphones 2-mi, 2-mj after times tmi(k), tmj(k), respectively, then tmi(k)=|Mmi−S(k)|/c, tmj(k)=|Mmj−S(k)|/c.

The delay time d(mi, mj; k) between the microphones 2-mi, 2-mj is d(mi, mj; k)=tmj(k)−tmi(k)=|Mmj−S(k)|/c−|Mmi−S(k)|/c if it does not include an error which is caused by an influence of noise or an influence of sampling.

If, taking an error which is caused by an influence of noise or an influence of sampling into consideration, a value obtained by adding the squares of such errors with regard to all of the delay times of the elements of E(k) is minimized with regard to S(k), then an optimum estimated value of S(k) can be obtained based on the least square error reference.

It is to be noted that, in the signal source position estimation described above, where the number M of microphones is 3, it is mathematically impossible to estimate the position of a signal source which is present at a spatially arbitrary position. Therefore, a plane in which the signal source is present should be assumed and used as a restriction condition regarding the position of the signal source to estimate the position. In this instance, in order for the calculation to be performed correctly, the plane assumed to include the signal source must be selected to that which does not perpendicularly intersect with a plane on which the three microphones are present, and may be selected, for example, to the plane on which the three microphones are present.

[Second Embodiment]

Figure 9:
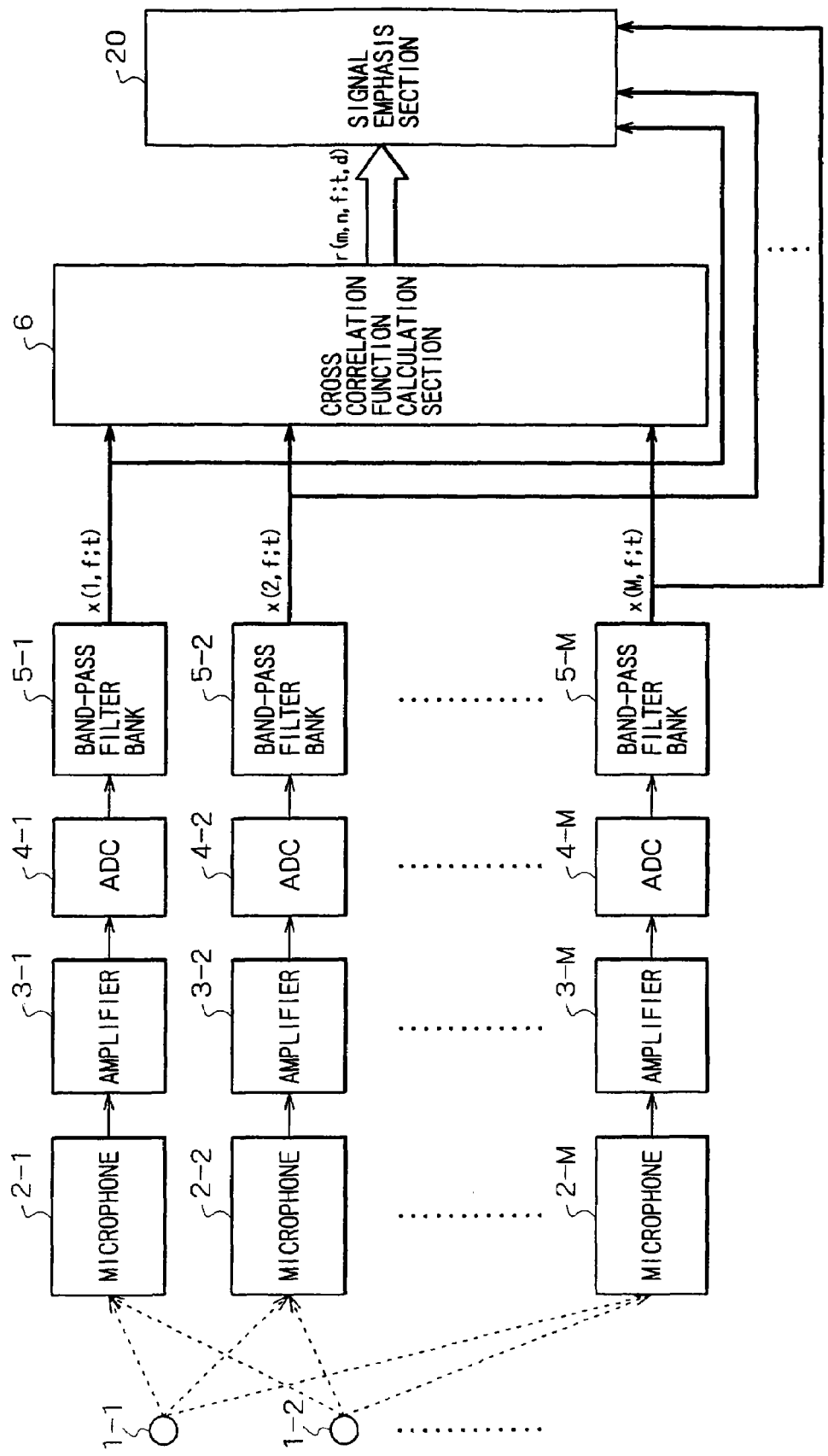
FIG. 9 is a block diagram schematically showing a configuration of another signal processing apparatus to which the present invention is applied.

FIG. 9 schematically shows a configuration of another signal processing apparatus to which the present invention is applied.

Referring to FIG. 9, the signal processing apparatus includes a plurality of (in the embodiment shown, M) reception systems composed of a plurality of (M) microphones 2-1, 2-2, . . . , 2-M for receiving a signal or signals generated from one or more signal sources 1-1, 1-2, . . . , M amplifiers 3-1, 3-2, . . . , 3-M for amplifying the received signals of the microphones 2-1, 2-2, . . . , 2-M, respectively, M A/D converters 4-1, 4-2, . . . , 4-M for converting the amplified signals from the amplifiers 3-1, 3-2, . . . , 3-M into digital signals, respectively, and M band-pass filter banks 5-1, 5-2, . . . , 5-M, respectively, a cross correlation function calculation section 6 for calculating cross correlation functions between frequency band signals for individual combinations of the reception systems for individual corresponding frequency bands, and a signal emphasis section 20 for emphasizing a signal from a signal source.

Signals received by the microphones 2-1, 2-2, . . . , 2-M and amplified by the amplifiers 3-1, 3-2, . . . , 3-M are converted into digital signals by the A/D converters 4-1, 4-2, . . . , 4-M, respectively, to obtain digital received signals x(m; t). Here, m (=1, 2, . . . , M) represents a reference number for identification of a microphone, and t (=1, 2, . . . ) represents the time represented in a unit of a sampling period selected so as not to deteriorate the signal.

Then, the received signals x(m, t) obtained by the analog to digital conversion are inputted to the band-pass filter bank sections 5-m (m=1, 2, . . . , M). Each of the band-pass filter bank sections 5-m is formed from a plurality of band-pass filters and can decompose an amplified and digitally converted received signal into a plurality of different frequency band signals. Here, an amplified and digitally converted received signal is decomposed into and outputted as F (>1) different band signals x(m, 1; t), x(m, 2; t), . . . , x(m, F; t). F represents the number of banks of each filter bank section.

Then, the M×F different band signals x(m, f; t) (m=1, 2, . . . , M; f=1, 2, . . . , F) are inputted to the cross correlation function calculation section 6. The cross correlation function calculation section 6 calculates and outputs, for individual combinations (m, n) of two different microphones, cross correlation functions r(m, n, f; t; d) (m=1, 2, . . . , M−1; n=m+1, m+2, . . . , M; f=1, 2, . . . , F; d=−T, −T+1, . . . , T) for corresponding different frequency bands. Here, d (=−T, −T+1, . . . , T) represents the delay time by which x(m, f, t) are delayed with reference to digital received signals x(n, f; t), and T represents the maximum delay time which is determined from the distance between microphones, the speed of the signal, and the sampling period as described hereinabove.

Then, the thus calculated M×(M−1)×F/2 different band cross correlation functions r(m, n, f; t; d) (m=1, 2, . . . , M−1; n=m+1, m+2, . . . , M; t=1, 2, . . . ; d=−T, −T+1, . . . , T) are inputted to the signal emphasis section 20. The signal emphasis section 20 thus emphasizes and outputs a signal or signals from a signal source or a plurality of signal sources.

Those functioning modules shown in FIG. 9 which are denoted by like reference characters to those of FIG. 1 denote substantially like internal configurations and operations, and therefore, overlapping description of them is omitted herein to avoid redundancy. In the following, an internal configuration and an operation characteristic of the signal emphasis section 20 are described. It is to be noted that the internal configuration and the operation of the signal emphasis section 20 are different depending upon whether the number M of microphones is 2 or 3 or more.

Figure 10:
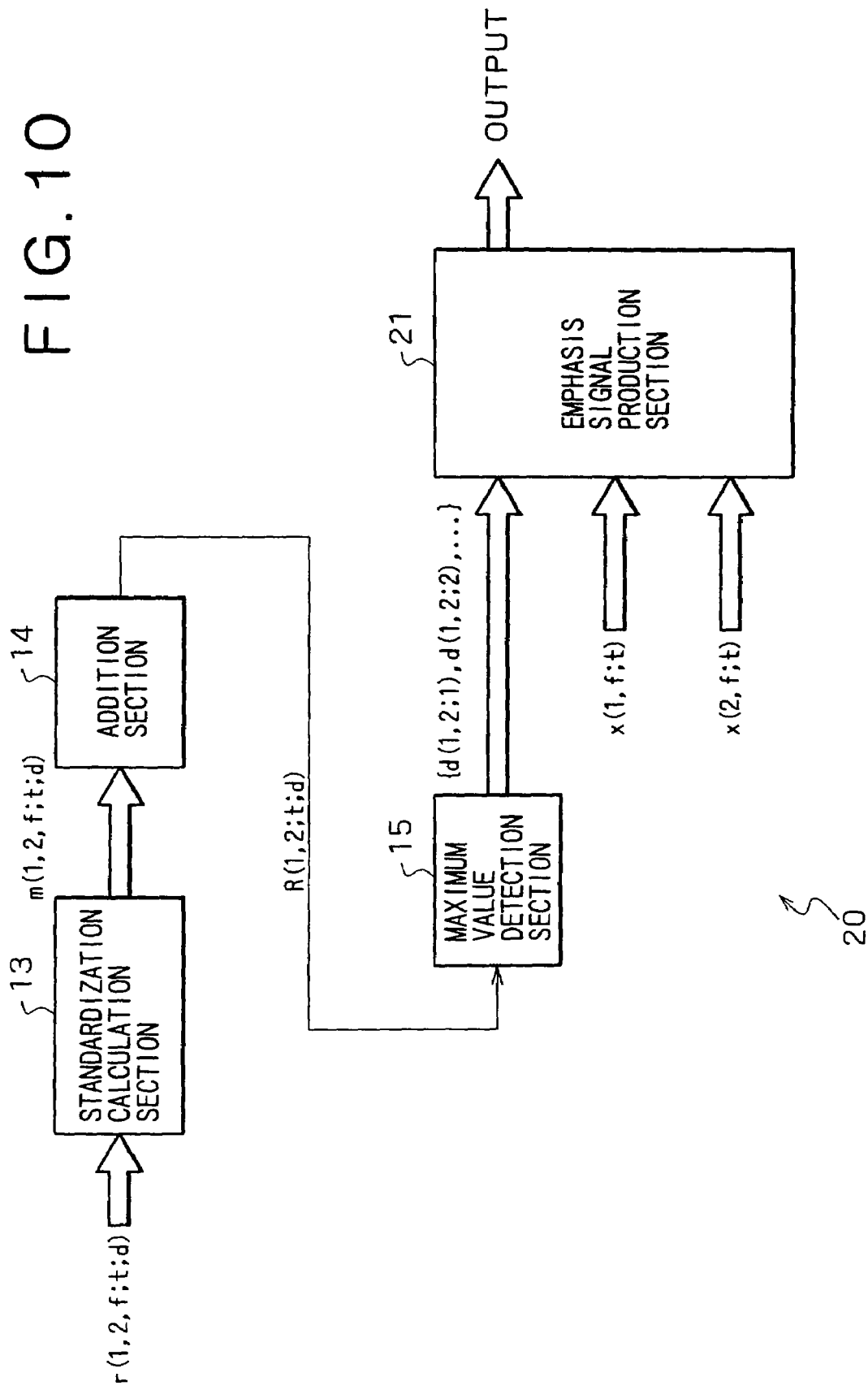
FIG. 10 is a block diagram showing an internal configuration of a signal emphasis section of the signal processing apparatus of FIG. 9 where the number of microphones is 2.

FIG. 10 shows an internal configuration of the signal emphasis section 20 where the number M of microphones is 2.

In the case of FIG. 10, the number of sets of two different microphones is only one as denoted by reference characters 1-1 and 1-2 in FIG. 9, and therefore, F cross correlation functions r(1, 2, f; t; d) (f=1, 2, ..., F) are inputted to the signal source direction or position estimation section 7. The cross correlation functions are normalized for each frequency band by a normalization calculation section 13 and outputted as normalized cross correlation functions rn(1, 2, f; t; d) (f=1, 2, ..., F).

The normalized cross correlation functions rn(1, 2, f; t; d) can be calculated by determining the maximum value or the variance of the cross correlation functions r(1, 2, f; t; d) with respect to the delay time d and dividing the cross correlation functions r(1, 2, f; t; d) by the thus determined value.

Then, the normalized cross correlation functions rn(1, 2, f; t; d) (f=1, 2, ..., F) are inputted to an addition section 14, by which they are added with regard to the numbers f of the filters. Then, resulting values are outputted as added cross correlation functions R(1, 2; t; d).

In this instance, the addition is preferably performed with regard to all filter numbers. Or, where a frequency band in which a signal or noise is included is known in advance, the addition may be performed only with regard to numbers corresponding to some plurality of frequency bands which include a signal or do not include noise, or weighted addition may be performed so as to emphasize components originating from signals to suppress components originating from noise.

Then, the added cross correlation functions R(1, 2; t; d) are inputted to a maximum value detection section 15, and the maximum value detection section 15 detects and outputs delay times d(1, 2; 1), d(1, 2; 2), ... which provide maximum values with regard to the delay time d.

Such maximum value detection may be performed, in order to eliminate detection of an insignificant maximum value which does not correspond to a signal source, using it as a condition that the maximum value reaches or exceeds a threshold value which is set in advance or is set using a statistic value such as an average or a variance of the added cross correlation functions R(1, 2; t; d).

The delay times d(1, 2; 1), d(1, 2; 2), ... detected by the maximum value detection section 15 and the different band signals x(m, f; t) (m=1, 2, ..., F) obtained by the decomposition by the band-pass filter bank sections 5-1, 5-2 are inputted to an emphasis signal production section 21. The emphasis signal production section 21 calculates emphasis signals y(1; t), y(2; t), ... by delayed addition using a delay unit and an adder and outputs the emphasis signals y(1; t), y(2; t), ....

The emphasis signals y(i; t), i(=1, 2, ... ) may be calculated, for example, by delaying the different band signals x(m, f; t) (m=1, 2; f=1, 2, ..., F) to x(1, f; t−T/2−d(1, 2; i)/2), x(2; f; t−T/2+d(1, 2; i)/2) in accordance with the delay time d(1, 2; k) by means of a delay unit not shown and then performing the following addition by means of an adder not shown:

$$y(i; t) = \Sigma f [x(1, f; t-T/2-d(1, 2; i)/2) + x(2, f; t-T/2+d(1, 2; i)/2)] \quad (5)$$

where $\Sigma f$ is the sum regarding the numbers f=1, 2, ..., F of the filters.

In the addition described above, the delayed different band signals x(m, f; t) (m=1, 2; f=1, 2, ..., F) are added with an equal weight. However, they may otherwise be added after they are multiplied by suitable weights based on the values of, for example, d(1, 2; i) or r(1, 2, f; t; d(1, 2; i)).

Figure 11:
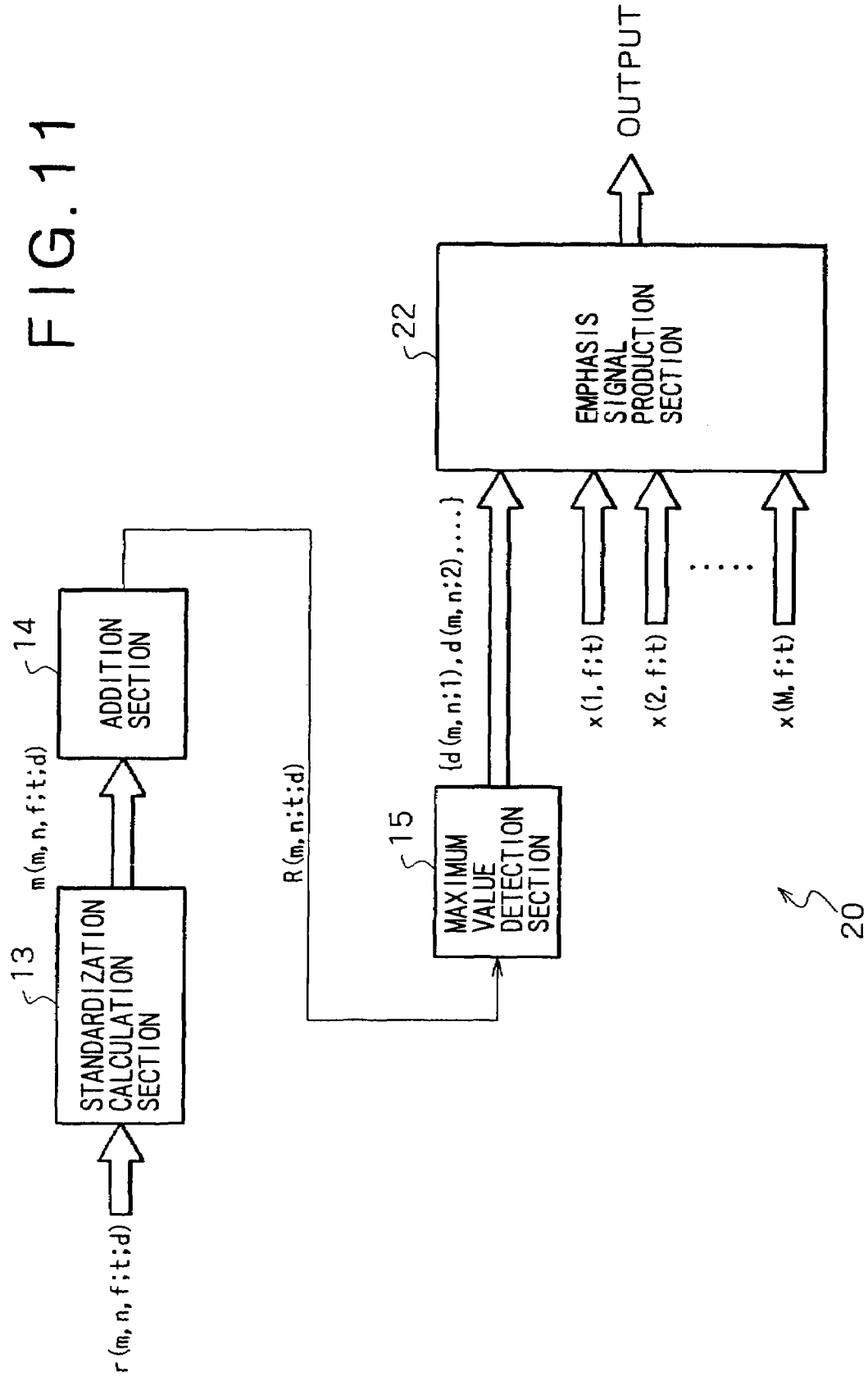
FIG. 11 is a block diagram showing an internal configuration of the signal emphasis section of the signal processing apparatus of FIG. 9 where the number of microphones is 3 or more.

FIG. 11 illustrates an internal configuration of the signal emphasis section 20 where the number M of microphones is 3 or more.

Similarly as in the case wherein the number of microphones is 2 (refer to FIG. 10), cross correlation functions r(m, n, f; t; d) (m=1, 2, ..., M−1; n=m+1, m+2, ..., M; f=1, 2, ..., F) are inputted to the normalization calculation section 13, and the normalization calculation section 13 normalizes the cross correlation functions r(m, n, f; t; d) for the individual frequency bands and outputs resulting functions as normalized cross correlation functions rn(m, n, f; t; d) (m=1, 2, ..., M−1; n=m+1, m+2, ..., M; f=1, 2, ..., F).

The normalized cross correlation functions rn(m, n, f; t; d) are calculated by determining such a value as a maximum value or a variance of the cross correlation functions r(m, n, f; t; d) with regard to the delay time d and dividing the cross correlation functions r(m, n, f; t; d) by the determined value.

Then, the normalized cross correlation functions rn(m, n, f; t; d) (m=1, 2, ..., M−1; n=m+1, m+2, ..., M; f=1, 2, ..., F) are inputted to the addition section 14. The addition section 14 adds the normalized cross correlation functions rn(m, n, f; t; d) with regard to the reference numbers f of the filters and outputs resulting values as added cross correlation functions R(m, n; t; d) (m=1, 2, ..., M; n=m+1, m+2, ..., M).

Normally, the addition by the addition section 14 is preferably performed with regard to all filter numbers. For example, where a frequency band in which a signal or noise is included is known in advance, the addition may be performed only with regard to numbers corresponding to some plurality of frequency bands which include a signal or do not include noise, or weighted addition may be performed so as to emphasize components originating from signals to suppress components originating from noise.

Then, the added cross correlation functions R(m, n; t; d) (m=1, 2, ..., M; n=m+1, m+2, ..., M) are inputted to the maximum value detection section 15. The maximum value detection section 15 detects and outputs delay times d(m, n; 1), d(m, n; 2), ... (m=1, 2, ..., M; n=m+1, m+2, ..., M) which provide maximum values with regard to the delay time d.

Such maximum value detection may be performed, in order to eliminate detection of an insignificant maximum value which does not correspond to a signal source, using it as a condition that the maximum value reaches or exceeds a threshold value which is set in advance or is set using a statistic value such as an average or a variance of the added cross correlation functions R(m, n; t; d).

The delay times d(1, 2; 1), d(1, 2; 2), . . . detected by the maximum value detection section 15 and the digital received signals x(m, f; t) (m=1, 2, . . . , M; f=1, 2, . . . , F) obtained by the decomposition by the band-pass filter bank sections 5-1, 5-2, . . . , 5-M are inputted to an emphasis signal production section 22. The emphasis signal production section 22 calculates emphasis signals y(1; t), y(2; t), . . . by delayed addition using a delay unit and an adder and outputs the emphasis signals y(1; t), y(2; t), . . . .

Figure 12:
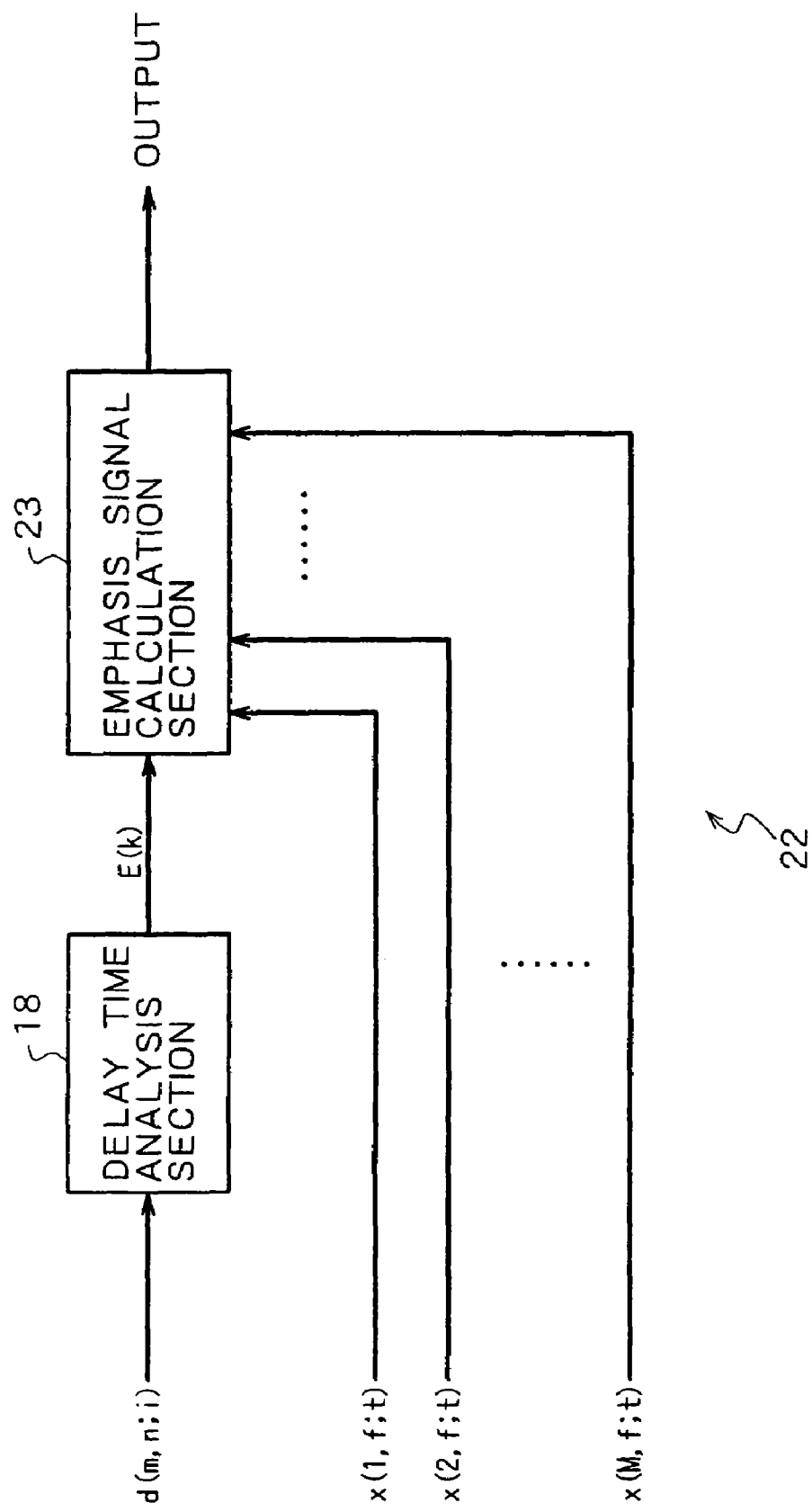
FIG. 12 is a block diagram showing an internal configuration of an emphasis signal production section of the signal processing apparatus of FIG. 9.

FIG. 12 shows an internal configuration of the emphasis signal production section 22.

The delay times d(m, n; i) (m=1, 2, . . . , M−1; n=m+1, m+2, . . . , M; i=1, 2, . . . ) are inputted to a delay time analysis section 18, by which they are classified into sets E(k)={d(m1, m2; k), d(m1, m3; k), . . . , d(m2, m3; k), . . . , d(mi, mj; k)} (k=1, 2, . . . ) for the individual estimated signal sources.

In this instance, the number i for distinction of different ones of the delay times d(m, n; i) is replaced suitably such that it may coincide with the number k for distinction of different ones of the estimated signal sources. This classification is performed such that, when delay times d(n1, n2; k), d(n1, n3; k), d(n2, n3; k) between received signals of three sets (n1, n2), (n1, n3), (n2, n3) of two different microphones produced from factors of a set (n1, n2, n3) (where n1<n2<n3) of three different microphones are selected arbitrarily from the set E(k) corresponding to a certain one signal source, the conditional expression (4) given hereinabove is satisfied.

Then, the sets E(k) (k=1, 2, . . . ) of the delay times classified for the individual signal sources and the different band signals x(m, f; t) ((m=1, 2, . . . , M; f=1, 2, . . . , F) obtained by the decomposition by the band-pass filter bank sections 5-1, 5-2, . . . , 5-M are inputted to the emphasis signal production section 22. The emphasis signal production section 22 calculates and outputs emphasis signals y(1; t), y(2; t), . . .

Figure 13:
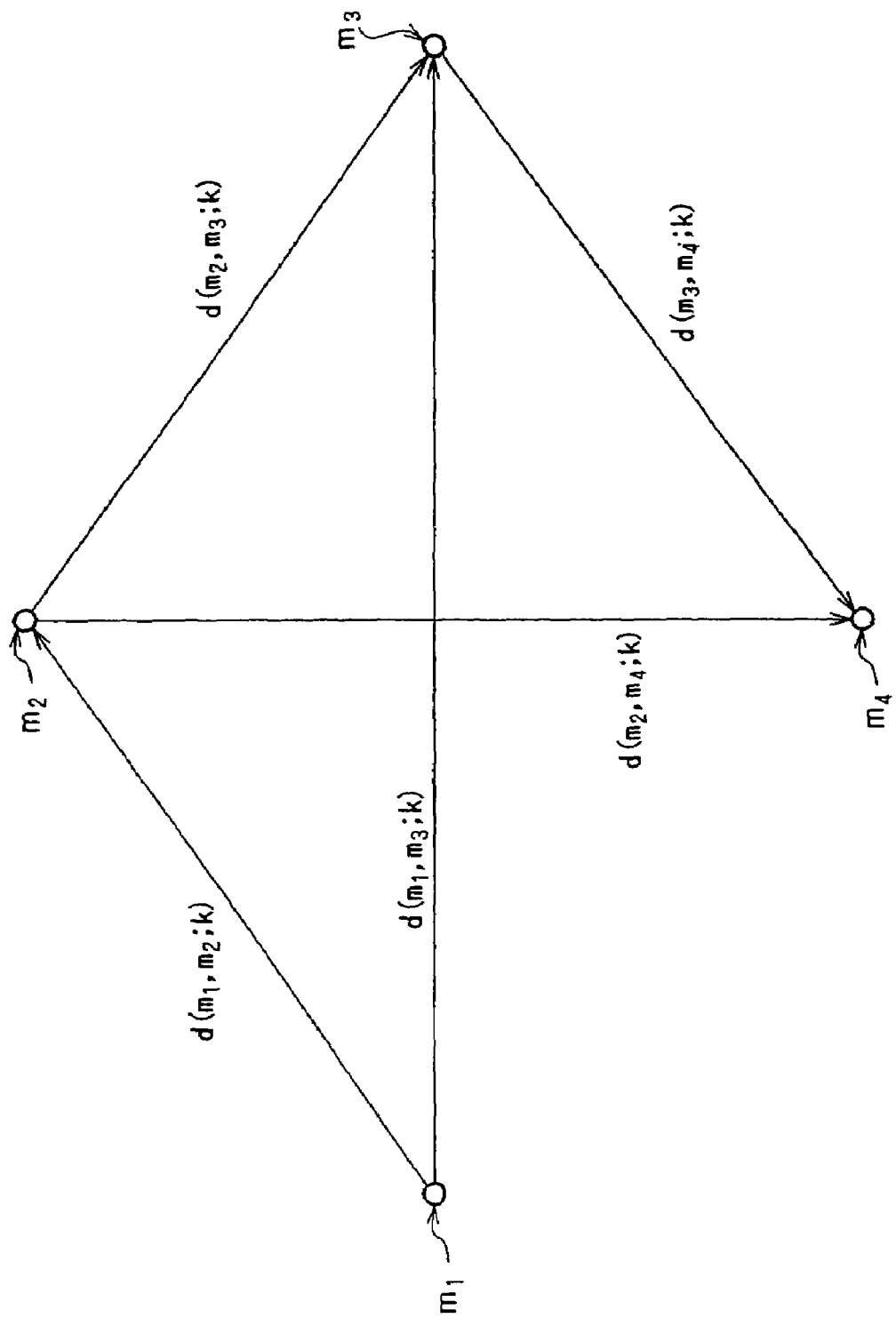
FIG. 13 is a diagrammatic view illustrating an example of method of emphasis signal calculation used in the signal processing apparatus of FIG. 9.

FIG. 13 illustrates an example of method of the emphasis signal calculation. Referring to FIG. 13, in the example illustrated, E(k)={d(m1, m2; k), d(m2, m3; k), d(m2, m4; k), d(m3, m4; k)} (m1<m2<m3<m4). In this instance, the number mi of the microphone 2-*mi* is allocated to a vertex mi, and if a delay time d(i, j; k) where the two different microphone numbers i and j are i<j is an element of E(k), then arrow marks representative of directed link are drawn using i as a start point and using j as an end point. The result is a graph shown in FIG. 13.

According to the procedure for determination of sets E(k) (k=1, 2, . . . ) of delayed times classified for individual signal sources described in connection with the first embodiment, the graph exhibits a continuous form without fail, or in other words, two arbitrary ones of vertexes of the graph is connected to each other by a directed link.

One of the vertexes is selected (in the example illustrated in FIG. 13, it is assumed that m1 is selected), and the delay amount zmi(k) from each vertex mi (i=1, 2, 3, 4) is calculated in the following manner.

In particular, one route from mi to m1 tracing the directed link d(i, j; k) is selected, and the values of d(i, j; k) are added along the route. Upon the addition, if the direction along which the route is followed and the direction of the directed link are same as each other, then the value of d(i, j; k) is multiplied by −1 as a weighting coefficient whereas, if the two directions are opposite to each other, then the value of d(i, j; k) is multiplied by +1 as a weighting coefficient, and resulting values are added. In the example illustrated in FIG. 13, the delay times are given by the following expressions:

$$zm1(k)=0$$
$$zm2(k)=-d(m1, m2; k)$$
$$zm3(k)=-d(m1, m3; k)$$
$$zm4(k)=-d(m1, m2; k)-d(m2, m4; k) \quad (6)$$

While, in the calculation of the delay amounts zmi(k) described above, one route is selected to perform the calculation, it is otherwise possible to perform calculation for a plurality of routes, calculate averages of the delay amounts and use the averages as the delay amounts zmi(k).

Thereafter, a certain value Z(k) is added equally to all zmi(k) so that all of zmi(k) may be in the positive or zero, and resulting values of the addition are set zmi(k). In the case illustrated in FIG. 13:

$$zm1(k)=Z(k)$$
$$zm2(k)=Z(k)-d(m1, m2; k)$$
$$zm3(k)=Z(k)-d(m1, m3; k)$$
$$zm4(k)=Z(k)-d(m1, m2; k)-d(m2, m4; k) \quad (7)$$

Finally, the delay amounts are used to delay x(mi, f; t) by means of delay units not shown, and results of the delaying are added by an adder not shown to calculate a delay-added emphasis signals y(k; t) in accordance with:

$$y(k; t)=\Sigma f[x(mi, f; t-zm1(k))+x(m2, f; t-zm2(k))+ \\ x(m3, f; t-zm3(k))+x(m4, f; t-zm4(K))] \quad (8)$$

where $\Sigma f$ is the sum regarding the numbers f=1, 2, . . . , F of the filters.

It is apparent from the calculation method of the delay calculation described above that, by the delay calculation, the differences of the times required for a signal from the signal source 1-*k* to arrive at the microphones 2-*m1*, 2-*m2*, 2-*m3*, 2-*m4* are compensated for by the delay with the delay amounts zm1(*k*), zm2(*k*), zm3(*k*), zm4(*k*), and the values obtained by the compensation are added as the signals which have been generated at the same time.

As an another example of the emphasis signal calculation method, the positions S(k) (k=1, 2, . . . ) of the signal sources are estimated by a signal source position estimation method similar to that described hereinabove in connection with the first embodiment, and delay times zi(k)=|S(k)−Mi|/c are calculated from the estimated signal source positions S(k) and the positions Mi (i=1, 2, . . . , M) of the microphones. Then, using the delay times zi(k)=|S(k)−Mi|/c, the emphasis signals y(k; t) can be calculated by delayed addition of the different band signals x(m, f; t) (m=1, 2, . . . , M; f=1, 2, . . . , F) decomposed by the band-pass filter bank sections 5-1, 5-2, . . . , 5-M in accordance with the following calculation expression:

$$y(k; t)=\Sigma f\Sigma m x(m, f; t-(Z-zm(k))) \quad (9)$$

where Z is a certain constant determined so that the delay amount may not become a negative value, $\Sigma f$ the sum regarding the filter number f, and $\Sigma m$ the sum regarding the microphone number.

In the delay addition according to the two different methods of emphasis signal calculation described above, the delayed different band signals x(m, f; t) (m=1, 2, . . . , M; f=1, 2, . . . , F) to be added are added all with an equal weight. However, the delayed different band signals may be added otherwise after they are multiplied by suitable weights, based on the values of for example, d(mi, mj; k) or r(mi, mj; f; t; d(mi, mj; k)).

In the following, application examples of the signal direction or position estimation apparatus and the signal emphasis apparatus according to the embodiments are described.

APPLICATION EXAMPLE 1

Figure 14:
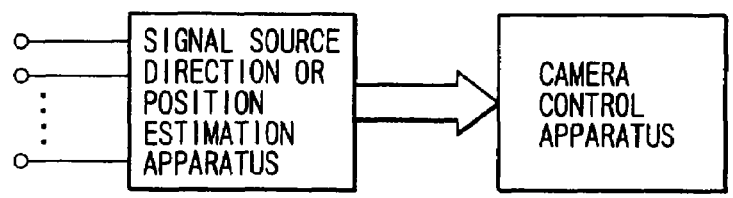
FIG. 14 is a block diagram showing an example of signal source direction or position estimation apparatus applied to a TV conference system or a supervision system.

Application of the signal source direction or position estimation apparatus to a TV conference system, a supervisory system:

By connecting an output of the signal source direction or position estimation apparatus including a plurality of microphones to a camera control apparatus (refer to FIG. 14), a camera can always be directed to a signal source. Or, where a plurality of cameras are connected to the camera control apparatus, the camera by which the output of the signal source direction or position estimation apparatus should be monitored may be changed over suitably. Or else, in response to position estimation of a signal source, a camera may be zoomed in toward the signal source.

APPLICATION EXAMPLE 2

Figure 15:
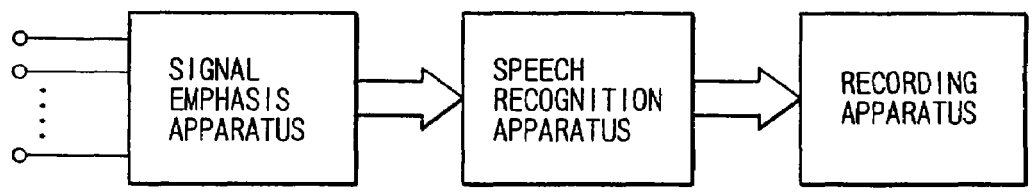
FIG. 15 is a block diagram illustrating an example of signal emphasis apparatus applied to an inputting apparatus.

Application of the signal emphasis apparatus to an inputting apparatus:

The signal emphasis apparatus according to the present invention can be used in place of a keyboard or some other user inputting apparatus of an information processing apparatus such as a computer or a portable terminal (PDA: Personal Digital Assistant). In particular, by speech recognition processing of an output of the signal emphasis apparatus including a plurality of microphones by means of a speech recognition apparatus (refer to FIG. 15), a command input of the character format to the information processing apparatus can be obtained. Also it is possible to use the signal emphasis apparatus as a user interface based on speech.

For example, a proceedings production system can be constructed by recording contents of utterance of speakers into a recording apparatus.

APPLICATION EXAMPLE 3

Figure 16:
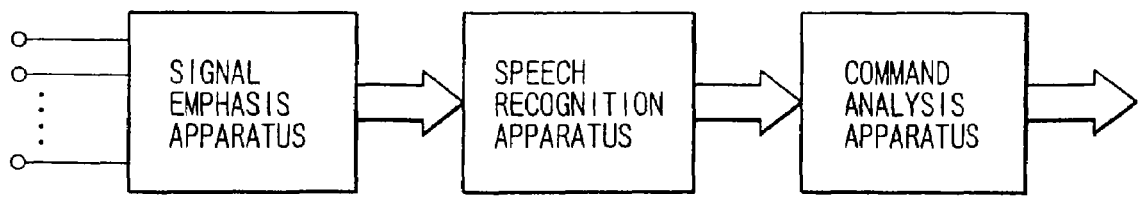
FIG. 16 is a block diagram illustrating an example of a signal emphasis apparatus applied to a commander/controller.

Application of the signal emphasis apparatus to a commander/controller:

The signal emphasis apparatus according to the present invention can be applied as commander/controller used for user operation of a robot, an automobile, a computer, a portable terminal (PDA) and various information apparatus. In particular, by performing speech recognition processing of an output of the signal emphasis apparatus including a plurality of microphones by means of a speech recognition apparatus to convert the output of the signal emphasis apparatus into characters and then performing analysis processing of the characters by means of a command analysis apparatus (refer to FIG. 16), contents of a command of a user can be specified.

For example, a "walk" instruction or some other operation instruction can be issued to a robot through such a commander/controller as described above. Further, by uttering "word processor" to a computer, a pertaining application can be started on the computer or characters can be inputted to the computer. Or, by uttering "today's schedule?" to a portable terminal which handles personal information such as a PDA, a scheduler can be started to extract a schedule of a pertaining data or hour. Or else, by uttering "call up xxx" to a telephone set, a telephone directory can be retrieved to originate a telephone call to a pertaining person. Also an instruction for such an operation as to "raise the room temperature" or "record xxx" can be issued to an information electric apparatus for domestic use. Further, by uttering "to go to the xxx's house" to a car navigation system, a road guide application can be started.

APPLICATION EXAMPLE 4

Figure 17:
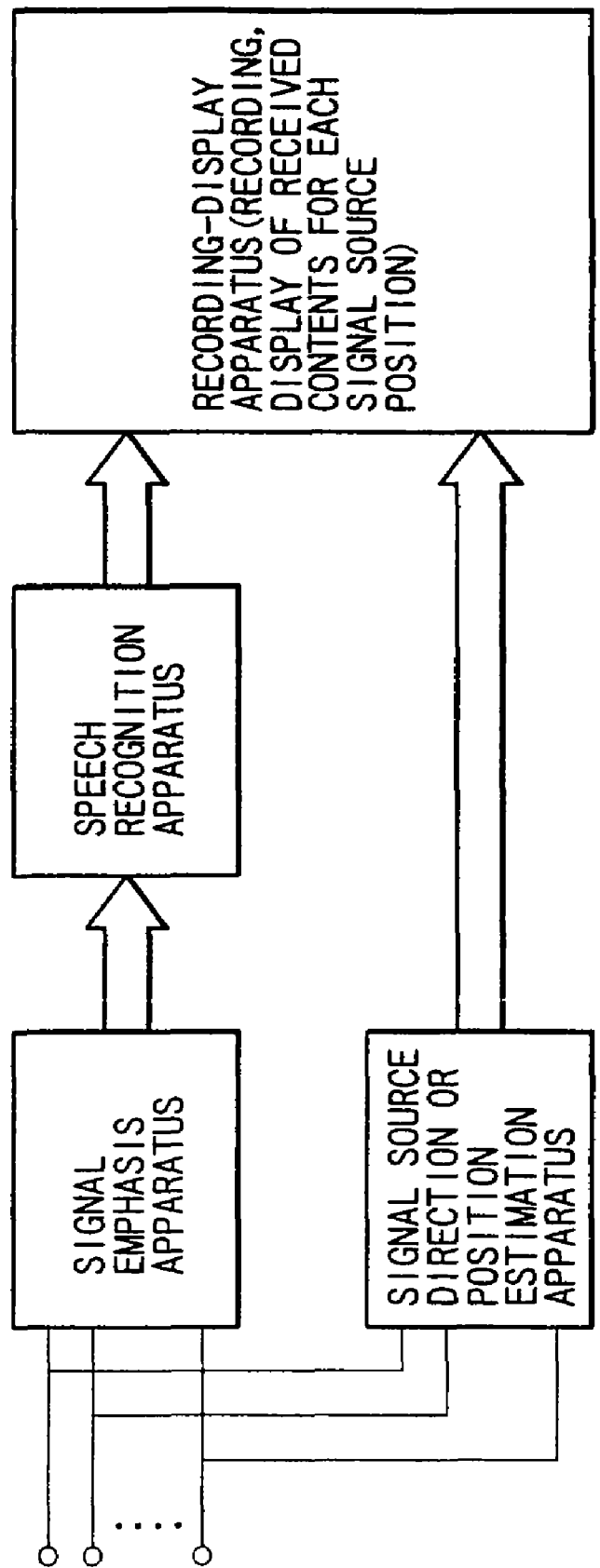
FIG. 17 is a block diagram showing an example of a signal source direction or position estimation apparatus and a signal emphasis apparatus applied to a TV conference system.

Application of the signal emphasis apparatus and the signal source direction or position estimation apparatus to a TV conference system:

An output of the signal emphasis apparatus including a plurality of microphones is inputted to a speech recognition system and a result of the speech input is outputted to a recording and/or display apparatus while an estimation result of the direction or the position of a signal source by the signal source direction or position estimation apparatus including a plurality of microphones is outputted to the recording and/or display apparatus (refer to FIG. 17).

The recording and/or display apparatus can successively record what utterance is given by a person present at what seat or specify a person which is uttering at present to follow up the person by means of a camera or cameras and display the person on a display.

APPLICATION EXAMPLE 5

Figure 18:
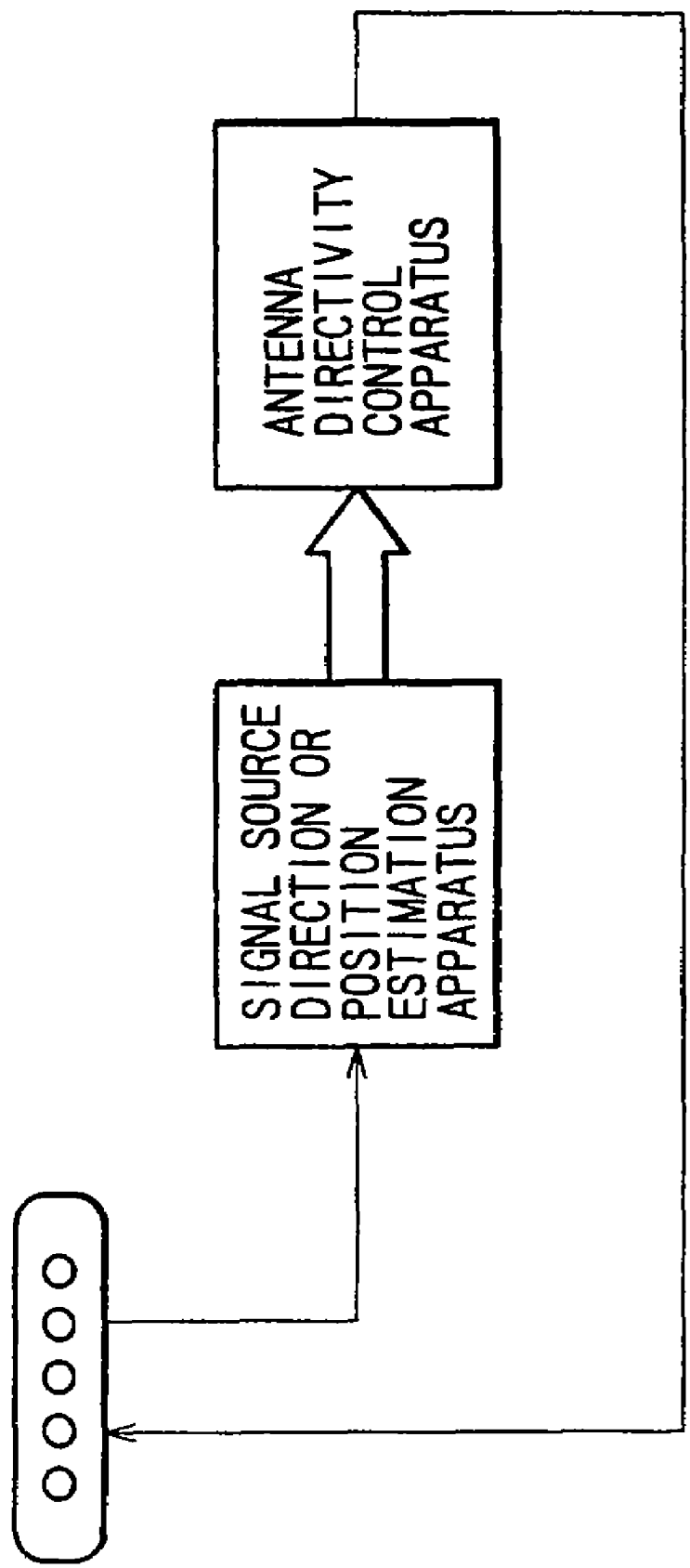
FIG. 18 is a block diagram showing an example of a signal source direction or position estimation apparatus applied to a smart antenna.

Application to a smart antenna:

An output of the signal direction or position estimation apparatus including a plurality of antennae is outputted to an antenna directivity control apparatus, and the position or the orientation of an antenna can be adjusted based on a control instruction of the antenna directivity control apparatus (refer to FIG. 18). According to a system of the type mentioned, the reception sensitivity of the antenna can be adjusted autonomously and dynamically. Further, if the system is incorporated in a base station or the like, then the connection situation from a cellular telephone set can be improved.

[Supplement]

The present invention has been described in detail in connection with the particular embodiments thereof. It is apparent, however, that the embodiments can be modified or altered by those skilled in the art without departing from the spirit or scope of the present invention.

When, in the first embodiment described hereinabove, the direction or the position of a signal source is estimated from cross correlation functions, or when, in the second embodiment described hereinabove, a signal is emphasized from cross correlation functions and different frequency band signals, the cross correlation functions are normalized for the individual frequency bands and the normalized cross correlation functions are added, for individual combinations of reception apparatus, over all or some plurality of frequency bands, and the delay times with which the added cross correlation functions exhibit maximum values are determined for individual combinations of the reception apparatus and such delay times are used as candidate delay times. However, the normalization described above is not necessarily required, and the later processing may be performed without performing the normalization. Further, the cross correlation functions need not necessarily be added over all or some plurality of frequency bands, but the delay times with which the cross correlation functions exhibit maximum values may be determined for the individual combinations of the reception apparatus and used as candidate delay times, or the delay times with which a plurality of cross correlation functions obtained by addition of a plurality of different frequency bands may be determined for the individual combinations of the reception apparatus and used as candidate delay times.

Further, in the first and second embodiments, the signal is sound, and the signal source is a sound source and the reception apparatus is a microphone. However, the present invention can be applied suitably, for example, to light, an electromagnetic wave or a wave on the surface of the water. Whichever one of the signals is used, the signal source may be an element or an apparatus which generates the signal and the reception apparatus may be an apparatus which can receive the signal.

Furthermore, the first and second embodiments are implemented using a digital signal processing technique. However, the digital signal processing technique may naturally be replaced partly or entirely by an analog signal processing technique or a processing technique by a computer depending upon the condition of the type of the signal source or hardware which can be used.

In summary, the present invention has been disclosed by way of an example and should not be interpreted restrictively, and determination of the subject matter of the present invention should be based on the appended claims.

What is claimed is:

1. A signal processing apparatus for processing a plurality of received signals obtained by receiving a signal or signals from a signal source or a plurality of signal sources through a plurality of reception apparatus, comprising:
    first means for decomposing each of the received signals into a plurality of different frequency band signals;
    second means for calculating cross correlation functions between the different frequency band signals originating from two different ones of said reception apparatus for individual corresponding frequency bands for individual possible combinations of said reception apparatus;
    third means for estimating delay times of individual ones of said reception apparatus which depend upon the direction or directions or the position or positions of the signal source or sources and an arrangement of said reception apparatus based on cross correlation functions; and
    fourth means for delaying the different frequency band signals of the received signals individually using the estimated delay times and adding the delayed different frequency band signals, and generating an emphasis signal output based on the addition of the delayed different frequency band signals.

2. A signal processing apparatus according to claim 1, wherein said first means is formed from a plurality of band-pass filters for passing signals of frequency bands different from each other therethrough.

3. A signal processing apparatus according to claim 1, wherein said third means includes:
    maximum value detection means for determining delay times with which the cross correlation functions exhibit maximum values for the individual frequency bands for the individual combinations of the reception apparatus and setting the determined delay times as candidate delay times; and
    estimation means for estimating the direction or directions or the position or positions of the signal source or sources so that the candidate delay times may be provided most consistently and estimating the delay times of the individual ones of said reception apparatus based on the estimated direction or directions or the estimated position or positions of the signal source or sources.

4. A signal processing apparatus according to claim 1, wherein said third means includes:
    normalization means for normalizing the cross correlation functions for the individual frequency bands;
    addition means for adding the cross correlation functions normalized for the individual combinations of said reception apparatus over all or some plurality of ones of the frequency bands; and
    estimation means for estimating the delay times of the individual ones of said reception apparatus based on results of the addition of the normalized cross correlation functions.

5. A signal processing apparatus according to claim 4, wherein said estimation means determines the delay times with which the cross correlation functions added by said addition means exhibit maximum values for the individual combinations of said reception apparatus, sets the determined delay times as candidate delay times, estimates the number and the direction or directions or the position or positions of the signal source or sources with which the candidate delay times are provided most consistently, and then estimates the delay times of the individual ones of said reception apparatus based on the estimated direction or directions or the estimated position or positions.

6. A signal processing apparatus according to claim 4, wherein said addition means performs, where the nature of the signal or each of the signals from the signal source or sources is known in advance, weighted addition so as to emphasize components originating from the received signals but suppress components which originate from noise.

7. A signal processing apparatus according to claim 1, wherein said fourth means determines, upon the addition of the delayed different frequency band signals, weighting coefficients for the individual frequency bands based on values of the cross correlation functions between the different frequency band signals for the estimated delay times and uses the weighting coefficients to perform weighted addition.

8. A signal processing apparatus according to claim 1, wherein the signal source or each of the signal sources is a sound source.

9. A signal processing apparatus for processing a signal played back from a recording medium on which a signal or signals received from a signal source or a plurality of signal sources through a plurality of reception apparatus are recorded, comprising:
    first means for decomposing each of the played back received signals into a plurality of different frequency band signals;
    second means for calculating cross correlation functions between the different frequency band signals originating from two different ones of said reception apparatus for individual corresponding frequency bands for individual possible combinations of said reception apparatus;
    third means for estimating delay times of individual ones of said reception apparatus which depend upon the direction or directions or the position or positions of the signal source or sources and an arrangement of said reception apparatus based on cross correlation functions; and fourth means for delaying the different frequency band signals of the received signals individually using the estimated delay times and adding the delayed different frequency band signals, and generating an emphasis signal output based on the addition of the delayed different frequency band signals.

10. A signal processing method for processing a plurality of received signals obtained by receiving a signal or signals from a signal source or a plurality of signal sources through a plurality of reception apparatus, comprising:

decomposing each of the received signals into a plurality of different frequency band signals;

calculating cross correlation functions between the different frequency band signals originating from two different ones of said reception apparatus for individual corresponding frequency bands for individual possible combinations of said reception apparatus;

estimating delay times of individual ones of said reception apparatus which depend upon the direction or directions or the position or positions of the signal source or sources and an arrangement of said reception apparatus based on cross correlation functions;

delaying the different frequency band signals of the received signals individually using the estimated delay times;

adding the delayed different frequency band signals; and generating an emphasis signal output based on the addition of the delayed different frequency band signals.

11. A signal processing method according to claim 10, wherein the step of calculating cross correlation functions includes:

a maximum value detection step of determining delay times with which the cross correlation functions exhibit maximum values for the individual frequency bands for the individual combinations of the reception apparatus and setting the determined delay times as candidate delay times; and an estimation step of estimating the direction or directions or the position or positions of the signal source or sources so that the candidate delay times may be provided most consistently and estimating the delay times of the individual ones of said reception apparatus based on the estimated direction or directions or the estimated position or positions of the signal source or sources.

12. A signal processing method according to claim 10, wherein the step of calculating cross correlation functions includes:

a normalization step of normalizing the cross correlation functions for the individual frequency bands;

an addition step of adding the cross correlation functions normalized for the individual combinations of said reception apparatus over all or some plurality of ones of the frequency bands; and an estimation step of estimating the delay times of the individual ones of said reception apparatus based on results of the addition of the normalized cross correlation functions.

13. A signal processing method according to claim 12, wherein, in the estimation step, the delay times with which the cross correlation functions added by the addition step exhibit maximum values are determined for the individual combinations of said reception apparatus, and the determined delay times are set as candidate delay times, whereafter the number and the direction or directions or the position or positions of the signal source or sources with which the candidate delay times are provided most consistently are estimated, and then the delay times of the individual ones of said reception apparatus are estimated based on the estimated direction or directions or the estimated position or positions.

14. A signal processing method according to claim 12, wherein, in the addition step, where the nature of the signal or each of the signals from the signal source or sources is known in advance, weighted addition is performed so as to emphasize components originating from the received signals but suppress components which originate from noise.

15. A signal processing method according to claim 10, wherein after the addition of the delayed different frequency band signals, weighting coefficients are determined for the individual frequency bands based on values of the cross correlation functions between the different frequency band signals for the estimated delay times and the weighting coefficients are used to perform weighted addition.

16. A signal processing method according to claim 10, wherein the signal source or each of the signal sources is a sound source.

17. A signal processing method for processing a signal played back from a recording medium on which a signal or signals received from a signal source or a plurality of signal sources through a plurality of reception apparatus are recorded, comprising:

decomposing each of the played back received signals into a plurality of different frequency band signals;

calculating cross correlation functions between the different frequency band signals originating from two different ones of said reception apparatus for individual corresponding frequency bands for individual possible combinations of said reception apparatus;

estimating delay times of individual ones of said reception apparatus which depend upon the direction or directions or the position or positions of the signal source or sources and an arrangement of said reception apparatus based on cross correlation functions;

delaying the different frequency band signals of the received signals individually using the estimated delay times;

adding the delayed different frequency band; and generating an emphasis signal output based on the addition of the delayed differnet frequency band signals.

* * * * *